US007027038B2

(12) United States Patent
Carro

(10) Patent No.: US 7,027,038 B2
(45) Date of Patent: Apr. 11, 2006

(54) SYSTEM AND METHOD FOR LOCATING ON A PHYSICAL DOCUMENT ITEMS REFERENCED IN ANOTHER PHYSICAL DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 09/923,150

(22) Filed: Aug. 6, 2001

(65) Prior Publication Data

US 2002/0101447 A1  Aug. 1, 2002

(30) Foreign Application Priority Data

Aug. 29, 2000 (EP) ................... 00480079

(51) Int. Cl.
*G09G 5/00* (2006.01)
(52) U.S. Cl. ............... 345/173; 345/156; 345/174; 345/175; 345/176; 345/177; 345/178; 345/179; 178/18.01; 178/18.09; 178/19.01; 178/19.02; 178/19.03; 178/19.04; 715/700; 715/702; 715/863; 715/864
(58) Field of Classification Search ............ 715/702, 715/501, 513, 863, 560, 517, 500, 700, 864; 345/173–179, 156; 709/232
See application file for complete search history.

(56) References Cited

U.S. PATENT DOCUMENTS

| 4,274,081 A | 6/1981 | Nomura et al. |
| 4,289,333 A | 9/1981 | Gaetano |
| 4,348,660 A | 9/1982 | Robertsen et al. |
| 4,504,913 A | 3/1985 | Miura et al. |
| 4,523,188 A | 6/1985 | Huber |
| 4,532,395 A | 7/1985 | Zukowski |
| 4,550,310 A | 10/1985 | Yamaguchi et al. |
| 4,571,684 A | 2/1986 | Takanabe et al. |
| 4,661,811 A | 4/1987 | Gray et al. |
| 4,680,430 A | 7/1987 | Yoshikawa et al. |
| 4,812,980 A | 3/1989 | Yamada et al. |
| 4,849,911 A | 7/1989 | Campian |
| 4,853,498 A | 8/1989 | Meadows et al. |
| 4,855,725 A | 8/1989 | Fernandez |
| 4,868,912 A | 9/1989 | Doering |

(Continued)

OTHER PUBLICATIONS

A framework for interacting with paper, Eurographics. 1997, vol. 16, No. 3- [www.cl.cam.ac.uk.Research/Orignami1997c/index.html].*

*Primary Examiner*—John Follansbee
*Assistant Examiner*—M. A Siddiqi
(74) *Attorney, Agent, or Firm*—Schmeiser, Olsen & Watts; David L. Adour

(57) ABSTRACT

The present invention generally relates to interactive hypermedia systems and more particularly to a method and system for locating on a physical document items referenced in another physical document. The present invention discloses a method and system for creating hyperlinks from items (e.g. words, pictures, foot notes, symbols, icons) on a first physical document to particular points on a second physical document (manuscript or printed document), for activating these hyperlinks simply by touching the first document, and for highlighting by means of a light emitting source, the position of the items on the second document. In a preferred embodiment, the present invention discloses a method and system for highlighting on a hard-copy map the geographic positions of places referenced in a hard-copy document.

16 Claims, 21 Drawing Sheets

U.S. PATENT DOCUMENTS

| | | |
|---|---|---|
| 4,952,918 A | 8/1990 | Fujita et al. |
| 4,973,960 A | 11/1990 | Mount, II |
| 5,070,467 A | 12/1991 | Todome |
| 5,105,544 A | 4/1992 | Ontiveros et al. |
| 5,149,919 A | 9/1992 | Greanias et al. |
| 5,150,457 A | 9/1992 | Behm et al. |
| 5,202,828 A | 4/1993 | Vertelney et al. |
| 5,239,152 A | 8/1993 | Caldwell et al. |
| 5,243,149 A | 9/1993 | Comerford et al. |
| 5,250,929 A | 10/1993 | Hoffman et al. |
| 5,311,302 A | 5/1994 | Berry et al. |
| 5,315,129 A | 5/1994 | Forrest et al. |
| 5,353,016 A | 10/1994 | Kurita et al. |
| 5,422,812 A | 6/1995 | Knoll et al. |
| 5,495,581 A | 2/1996 | Tsai |
| 5,555,354 A | 9/1996 | Strasnick et al. |
| 5,597,183 A | 1/1997 | Johnson |
| 5,624,265 A | 4/1997 | Redford et al. |
| 5,640,193 A | 6/1997 | Wellner |
| 5,668,576 A | 9/1997 | Ikura et al. |
| 5,692,073 A | 11/1997 | Cass |
| 5,703,436 A | 12/1997 | Forrest et al. |
| 5,706,030 A | 1/1998 | Ishigami et al. |
| 5,757,026 A | 5/1998 | Forrest et al. |
| 5,757,139 A | 5/1998 | Forrest et al. |
| 5,811,833 A | 9/1998 | Thompson |
| 5,834,893 A | 11/1998 | Bulovic et al. |
| 5,844,363 A | 12/1998 | Gu et al. |
| 5,861,219 A | 1/1999 | Thompson et al. |
| 5,861,885 A | 1/1999 | Strasnick et al. |
| 5,870,767 A | 2/1999 | Kraft, IV |
| 5,903,729 A | 5/1999 | Reber et al. |
| 5,905,251 A | 5/1999 | Knowles |
| 5,915,285 A | 6/1999 | Sommer |
| 5,917,280 A | 6/1999 | Burrows et al. |
| 5,918,012 A | 6/1999 | Astiz et al. |
| 5,923,388 A | 7/1999 | Kurashima et al. |
| 5,932,895 A | 8/1999 | Shen et al. |
| 5,953,587 A | 9/1999 | Forrest et al. |
| 5,957,697 A | 9/1999 | Iggulden et al. |
| 5,984,362 A | 11/1999 | Christman |
| 5,986,401 A | 11/1999 | Thompson et al. |
| 5,998,803 A | 12/1999 | Forrest et al. |
| 6,005,252 A | 12/1999 | Forrest et al. |
| 6,013,538 A | 1/2000 | Burrows et al. |
| 6,013,982 A | 1/2000 | Thompson et al. |
| 6,154,213 A * | 11/2000 | Rennison et al. ........... 715/854 |
| 6,407,757 B1 * | 6/2002 | Ho .............. 715/776 |
| 6,512,840 B1 * | 1/2003 | Tognazzini ................ 382/119 |
| 6,546,397 B1 * | 4/2003 | Rempell ..................... 707/102 |
| 6,647,130 B1 * | 11/2003 | Rhoads ................. 382/100 |
| 6,650,889 B1 * | 11/2003 | Evans et al. ............. 455/412.1 |
| 6,681,045 B1 * | 1/2004 | Lapstun et al. ............. 382/187 |
| 6,762,775 B1 * | 7/2004 | Ho .............. 715/776 |
| 6,771,283 B1 * | 8/2004 | Carro ........................ 715/702 |

\* cited by examiner

FIG. 6

The Ruzic's

*Travel Guide to the Balkans* http://www.imisite.org/beserk/dalmatia.html

Document: 387

© Bosiljko Vasilj
Medjugoje, Bosnia and Herzegovina
Telephone: (387-88) 650-055

FIG. 8

Zagreb to Mostar and Vicinity

ZAGREB

Rental cars in Zagreb, the capital of Croatia, are becoming hard to come by due to NATO's deployment. It is recommended that reservations be made in advance in order to avoid delays. If insurance is purchased when renting, be advised that the moment you cross the Bosnia proper it is no longer valid. Drivers in Croatia are fair, but in Herzegovina and Bosnia itself they are outright dangerous. Take extreme precautions. If you don't do it anywhere else in the world, in Bosnia and Herzegovina you must drive defensively.

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

Map of KARLOVAC

If you travel this route in winter, the conditions can be very rough. Ice, snow and deep drifts are common. In many places, the road falls off into steep gorges. Take extreme caution. If you go off one of these gorges, it may be Spring before you are found. There is traffic along the road all day and late into the night when trucks use it to beat the daytime

53231 PLITVICKA KEZERA - NATIONAL PARK
  tel: +385 53 751-000  fax: +385 53 751-001
TOURIST INFORMATION AND RESERVATIONS
  tel: +385 53 751-015  tel: +385 53 751-014  fax: +385 53 751-013

HOTEL BELLEVUE/GARNI/(160 beds) **
telephone: +385 53 751 700, 751 015 (reservation);  telefax: +385 53 751 013

The National Park Plitvicka jezera (Plitvice Lakes) is one of the most beautiful <u>Return to Balkans Hotel Guide</u> Home Page.

Doc. 387 - "Travel Guide to the Balkans" - Pg. 16 - "Hotel Bellevue"
X=035 Y=155  http://www.tel.hr/np-plitvice/smje/bellevue.htm

FIG. 16

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

from: "Travel Guide to the Balkans". Document: 387

FIG. 18

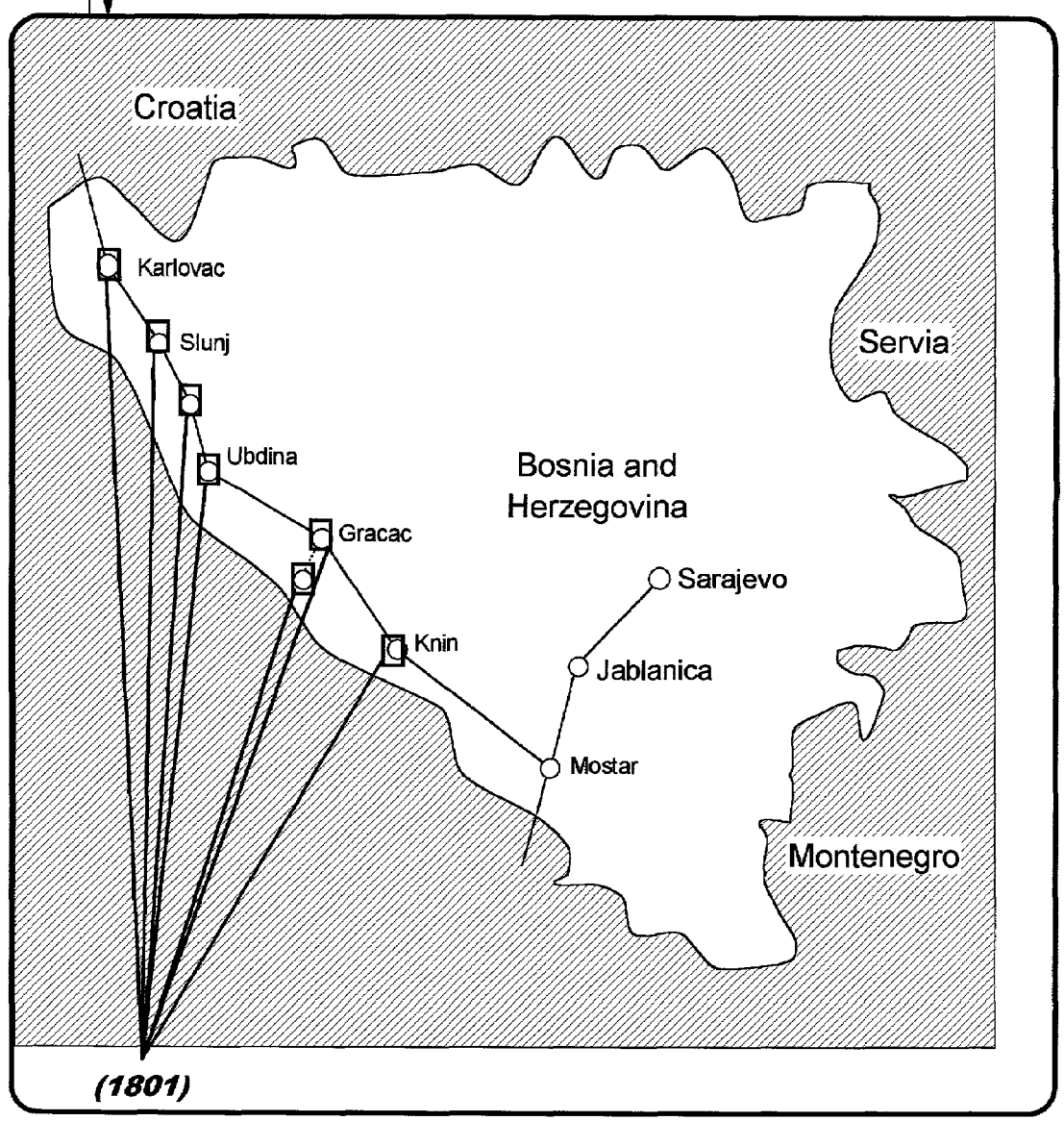

(1801)

Getting Around, Taking Precautions

If traveling from Zagreb via Karlovac and down through Knin you will cross the region known as Lika. This is a mountainous stretch through which runs the length of the Mala Kapela hills. There is a lovely section of national park known as Plitvice Jezera. At the center of the park is the Hotel Bellevue and if you get in trouble on the road or run into inclement weather, it is a good place to hole up. It is, however, pricey. Primary villages along this route include Slunj, Plitvice, Udbina, and Gracac. Between them is little or nothing.

SYSTEM AND METHOD FOR LOCATING ON A PHYSICAL DOCUMENT ITEMS REFERENCED IN ANOTHER PHYSICAL DOCUMENT

FIELD OF THE INVENTION

The present invention generally relates to interactive hypermedia systems and more particularly to a method and system for locating on a first physical document items referenced in a second physical document and creating hyperlinks from items (e.g. words, pictures, footnotes, symbols, icons) on the first physical document to particular points on the second physical document.

BACKGROUND OF THE INVENTION

The Internet is a global network of computers and computer networks (the "Net"). The Internet connects computers that use a variety of different operating systems or languages, including UNIX, DOS, Windows, Macintosh, and others. To enable communication among these various systems and languages, the Internet uses a language referred to as TCP/IP ("Transmission Control Protocol/Internet Protocol"). TCP/IP protocol supports three basic applications on the Internet:

transmitting and receiving electronic mail,
logging into remote computers (the "Telnet"), and
transferring files and programs from one computer to another ("FTP" or "File Transfer Protocol").

With the increasing size and complexity of the Internet, tools have been developed to help find information on the network. These tools are often called navigators or navigation systems. Navigation systems that have been developed include standards such as Archie, Gopher and WAIS. The World Wide Web ("WWW" or "the Web") is a recent and superior navigation system. The Web is:

an Internet-based navigation system,
an information distribution and management system for the Internet, and
a dynamic format for communicating on the Web.

The Web seamlessly integrates various kinds of information, including still images, text, audio and video. A Web user with a graphical user interface ("GUI", pronounced "gooey") may transparently communicate with different host computers on the system, different system applications (including FTP and Telnet), and different information formats for files and documents including, for example, text, sound and graphics.

The Web uses hypertext and hypermedia. Hypertext is a subset of hypermedia and refers to computer-based "documents" in which readers move from one place to another within a document, or from one document to another, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet. A resource of the Internet is unambiguously identified by a Uniform Resource Locator (URL), which is a pointer to a particular resource at a particular location. A URL specifies the protocol used to access a server (e.g. HTTP, FTP, and so forth), the name of the server, and the location of a file on that server.

Each Web page may appear as a complex document that integrates, for example, text, images, sounds and animation. Each such page may also contain hyperlinks to other Web documents so that a user at a client computer may click on icons with a mouse and thereby activate hyperlink jumps to a new page on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages.

Web clients when browsing, convert user specified commands into HTTP GET requests, connect to the appropriate Web server to get information, and wait for a response. The response from the server can be the requested document or an error message. After the document or an error message is returned, the connection between the Web client and the Web server is closed.

After receipt, the Web client formats and presents the data or activates an ancillary application such as a sound player to present the data. To do this, the server or the client determines the various types of data received. The Web Client is also referred to as the Web Browser, since it in fact browses documents retrieved from the Web Server.

Through web browsers, interactive electronic services, video-on-demand, and the World Wide Web are providing access to an increasing offering of movies, shopping information, games, multimedia documents, electronic commerce and many other services. During the last several years, due mainly to the widespread use of personal computers and the capability of millions of users to access the World Wide Web, "multimedia publishing" has veritably exploded. Due to the widespread penetration of CD-ROM drives, an enormous number of multimedia titles combining text, images and sounds, are now accessible to owners of personal computers. Further, a vast store of hypermedia information is today accessible via the Internet on the World Wide Web.

A major problem in using these multimedia systems is to browse the enormous variety and quantity of information, to discover what is available, and to make a selection among all the possible choices. For example, when surfing on the Web, a conventional method of navigating across many pages of hypertext documents consists of using search tools or invoking bookmarked links. When surfing video-on-demand services, a conventional navigation method is to surf on channels. Advertisements on preview channels are used as entry points to other movies. Users can navigate and make selections from a remote control using hierarchical menus. Obviously, these approaches do not enable a user to access and browse the thousands of multimedia documents that are available on the Web or interactive TV.

A study of the different information needs shows that there is a common thread. For all kind of reasons, people more and more often need to be rapidly and easily informed about their environment. They want to have information about the resources or services located in different regions of the world, in rural, industrial or urban areas. This common need was identified long ago by Geographic Information Systems (GIS) providers, cartographic information providers and, more recently, by many Internet information providers.

These institutions and many others (e.g.: travel agencies, government agencies, local authorities, etc.) today provide geographic and cartographic information in the Web by means of several services. Basically, these services enable the user to access, browse or download many different types of digitized maps covering practically all regions of the world. Recently, due mainly to the widespread use of the Global Positioning System (GPS) and in-vehicle computerized navigation systems, and the capability of millions of users to access the World Wide Web, "digital map publishing" has veritably exploded. Due to the widespread penetration of CD-ROM drives, a large number of geographic and cartographic titles are now available to owners of personal computers. Because Internet users can access GIS applications from their browsers without purchasing proprietary GIS software, WebGIS has the potential to make Distributed Geographic Information (DGI) available to a very large worldwide audience. Today WebGIS makes possible the addition of GIS functionality to a wide range of network-based applications in business, government, and education. Due to this rapid evolution, a vast storehouse of cartographic content is today accessible via the Internet, particularly the World Wide Web.

Even though electronic digital maps can be accessed and retrieved throughout the Web by any Internet device (e.g., by a Personal Digital Assistant (PDA) or a WAP enabled smart phone), some drawbacks persist. The retrieval, storage and display of a high resolution digital map requires high communication bandwidth, a large memory, and high graphic resolution. However, the wireless mobile environment, wherein small, economic, lightweight hand-held devices are commonly used (such as cell phones and Personal Digital Assistants), imposes limitations for transferring, storing, displaying and manipulating in a Web Browser large image files such as high resolution digital maps.

To overcome these limitations, several technologies are emerging. These technologies are intended to enable Internet service providers, telecommunications carriers, and Internet-based businesses to offer Web content (originally intended to be displayed on PCs and laptops) to users of wireless devices. For example, transcoders translate existing information and images on Web sites into a format readable by hand-held devices, such as cell phones, games consoles, PDAs or Web browsers installed in cars. One purpose of transcoding is, for example, to re-size a map. If a driver requests a street map from his car-based Web browser, the transcoding software can take a map originally designed for a PC-based browser and re-size it to fit the screen of the mobile device installed in the car. However, with the technology available today, a paper road map of normal size and resolution cannot be read comfortably after having been digitized, minimized, and displayed on a small screen. Thus, even though transcoding is a good solution to adapting the format of highly textual Web pages, this technique does not solve the problem of displaying, even with minimum comfort, a digitized version of a full size paper map on a small size and low resolution display of a cell phone.

On the other hand, people are very skillful at browsing through paper catalogs, magazines, newspapers, maps and books by flipping through the pages and glancing at pictures and text. Even though the enthusiasm of the public for new computer-based multimedia services has been seen by many analysts as a threat to conventional forms of hard-copy publishing, particularly book publishing, experience teaches that reading a book cannot be compared with reading an electronic document. In fact, today, reading paper copy remains preferable to most people, whether they are familiar with computers or not.

A Publication entitled "The Last Book", (*IBM Systems Journal*, Vol 36, No. 3 Vol 36, No. 3-1997, by J. Jacobson, et al.), clearly illustrates the differences between printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

The same arguments concerning the friendliness and usefulness of hard-copy books apply to hard-copy geographic maps. So even though the enthusiasm of the public for computer-based digital technology might be seen as a threat to conventional paper documents and maps, in reality the use of physical documents remains preferable to most people, whether they are skilled or not in using computers.

Nevertheless, physical documents sorely lack the many advantages provided by today's computer technology. Thus, there is a need for a way to enhance the usefulness of physical documents by providing the advantages of computer-based technology.

SUMMARY OF THE INVENTION

The present invention generally relates to interactive hypermedia systems and more particularly to a method and system for creating hyperlinks from hyperlinked items referenced in a first physical document to particular points on a second physical document. One embodiment of the invention includes the steps of creating a hyperlink table for the first physical document and storing in the hyperlink table an identification of the first physical document; and, for each page of the first physical document, storing in the hyperlink table an identification of the page and an identification of hyperlinked items defined on this page;

associating with each hyperlinked item referenced in the first physical document, a point on a page of a second physical document;

storing in the hyperlink table for each hyperlinked item, absolute coordinates of the associated point;

determining the position of points pressed on a first opto-touch foil; the first opto-touch foil being placed and aligned over or under the page of the first physical document; the first opto-touch foil being pressed at points corresponding to the position of the hyperlinked items; and storing in the hyperlink table, the position of the points pressed, the hyperlink table comprising for each hyperlinked item, an indication of its position on the page of the first physical document.

Another embodiment of the invention includes a method and system for activating hyperlinks from hyperlinked items referenced in a first physical document to particular points on a second physical document. This embodiment includes the steps of:

identifying a first physical document;

identifying a page in this first physical document;

determining the position of a point pressed on a first opto-touch foil placed and aligned over or under the identified page; the first opto-touch foil being pressed at a point corresponding to a selected hyperlinked item;

identifying the selected hyperlinked item referring to a hyperlink table associated with the first physical document, this hyperlink table comprising an indication of the position of each hyperlinked item referenced in the identified page of the first physical document;

identifying the position on a page of a second physical document of a point associated with the identified selected hyperlinked item referring to the hyperlinked table, the hyperlinked table comprising for each hyperlinked item referenced in the first physical document, the position of a point on a page of a second physical document; and sending to a second opto-touch foil the position of the point associated with the selected hyperlinked item on the page of the second physical document, the second opto-touch foil being placed and aligned over or under the page of the second physical document; the second opto-touch foil being used for highlighting the point associated with the selected hyperlinked item.

The foregoing, together with other objects, features, and advantages of this invention can be better appreciated with reference to the following specification, claims and drawings.

BRIEF DESCRIPTION OF THE DRAWINGS

The novel and inventive features of the invention are set forth in the appended claims. The invention itself may best be understood by reference to the following detailed description of an illustrative embodiment when read in conjunction with the accompanying drawings, wherein:

FIG. 6 shows a physical document.

FIG. 8 shows the items of a page of the physical document for which hyperlinks must be created.

FIG. 15 shows how the information related to the item selected by pressing the opto-touch foil placed over or under the document is displayed.

FIG. 16 shows a physical map and a physical document referencing locations on this map.

FIG. 18 shows how the locations corresponding to highlighted items on the page of the physical document are illuminated by means of the opto-touch foil placed over the map.

DETAILED DESCRIPTION

The invention provides a system and method for locating on a physical document items referenced in the same or in a different physical document, and optionally, for accessing multimedia information and/or services located in a user workstation or in one or a plurality of servers connected to a communication network. More particularly, the invention discloses a system and method for highlighting on a paper map the geographic location of one or a plurality of places cited or referenced in a physical document.

In a particular embodiment, the invention relates to the creation in a first physical document of hyperlinks from printed items (e.g. words, pictures, foot notes, symbols, icons) to other items or particular points on a second physical document. More particularly, the invention provides a system and method for assigning geographic coordinates (absolute coordinates) to items (for example places like towns, motels, public buildings, water springs, historic monuments, factories, etc.) cited or referenced in the first physical document (for example, cited in a hard-copied travel guide). The activation of "geographic links" associated with a particular printed item on the first physical document, for example a directory of hotels, results in highlighting the position of this item on the second physical document, for example a paper map.

In a particular embodiment, the system comprises two transparent opto-touch foils placed aligned, respectively, on the first physical document and on the second physical document, preferably a geographic map. Both opto-touch foils are connected to a user workstation. The second opto-touch foil generates optical signals highlighting the locations, on the geographic map, of all places referenced in the first physical document. The system may include logic for computing the coordinates on the second opto-touch foil of the locations related to the items referenced in the first physical document and for highlighting these locations on the geographic map by luminous signals.

System for Highlighting Positions of Items on Physical Documents

Figure 5:
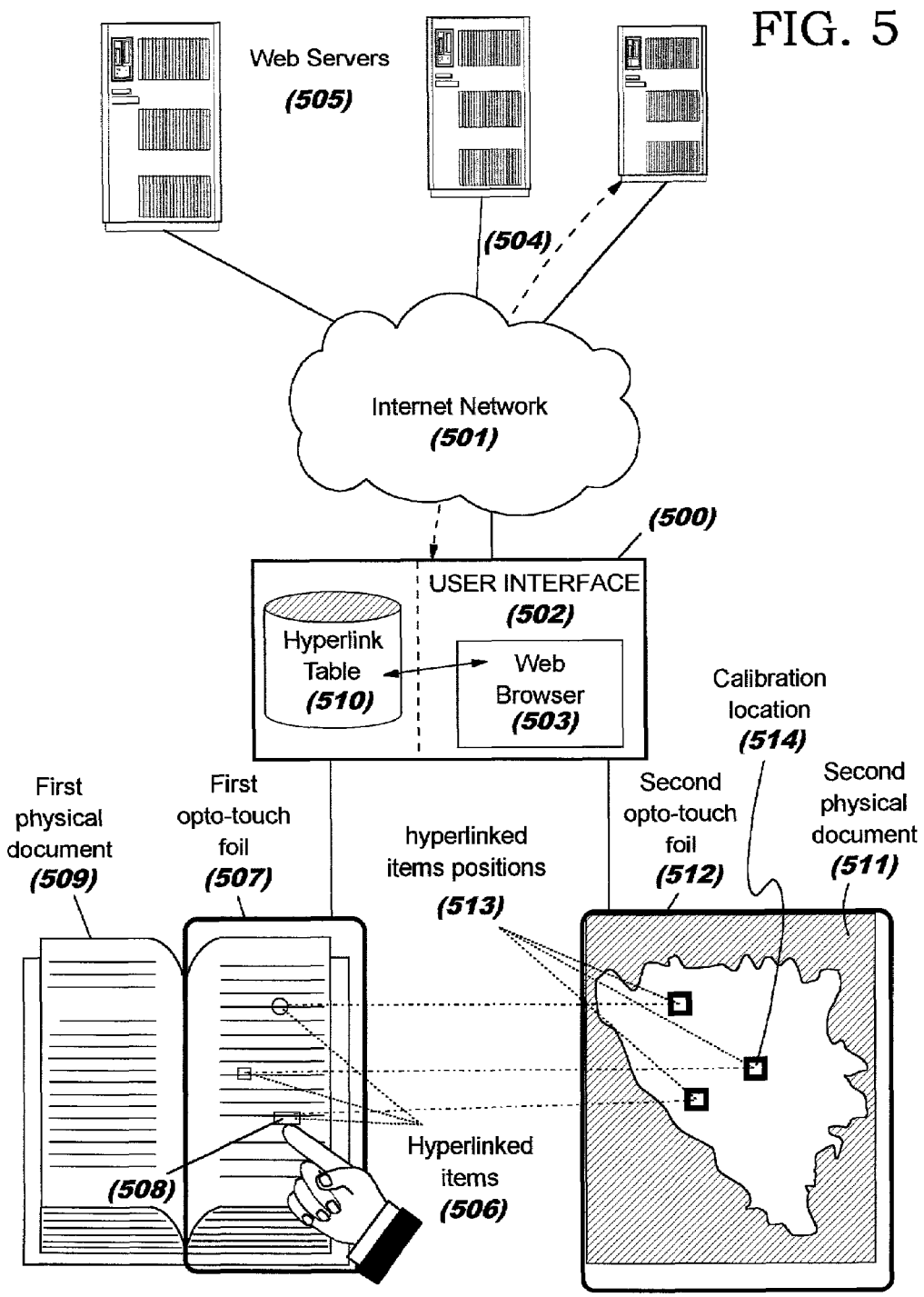
FIG. 5 shows the mechanisms of selection, information access and display of hyperlinked items.

As shown in FIG. 5, an exemplary embodiment of the invention includes:

- first opto-touch foil (507), preferably transparent, placed by the user over (or under) a first physical document (509), or a portion of this first document. This first opto-touch foil is used to illuminate and highlight hyperlinked items (506) over the surface of the first physical document, and to read coordinates of these hyperlinked items;
- a user workstation (500) for accessing the information and/or the service associated with the hyperlinked items (506); and
- a second opto-touch foil (512) (or even the same first opto-touch foil) preferably transparent, placed by the user over (or under) a second physical document (511), or a portion of the second document. This second opto-touch foil is used to illuminate and highlight on a second physical document (511) items or points (513) related to items selected by the user on the first physical document (506).

The physical documents (509), (511) can be of any kind, for example geographic maps (e.g., topographical maps, political maps, historical maps, route maps, shaded relief maps, city maps, natural resources maps, rail road maps and so forth) books, technical plans, commercial catalogs or any other type of hard-copy, engraved, written, or printed surfaces (e.g., paintings in a museum of art). The material of the physical documents may be paper, plastic, wood or any other material.

In a preferred embodiment, opto-touch foils (507), (104) comprise two, functionally independent transparent foils, namely a touch foil, and a light emitting foil (opto foil).

Figure 2:
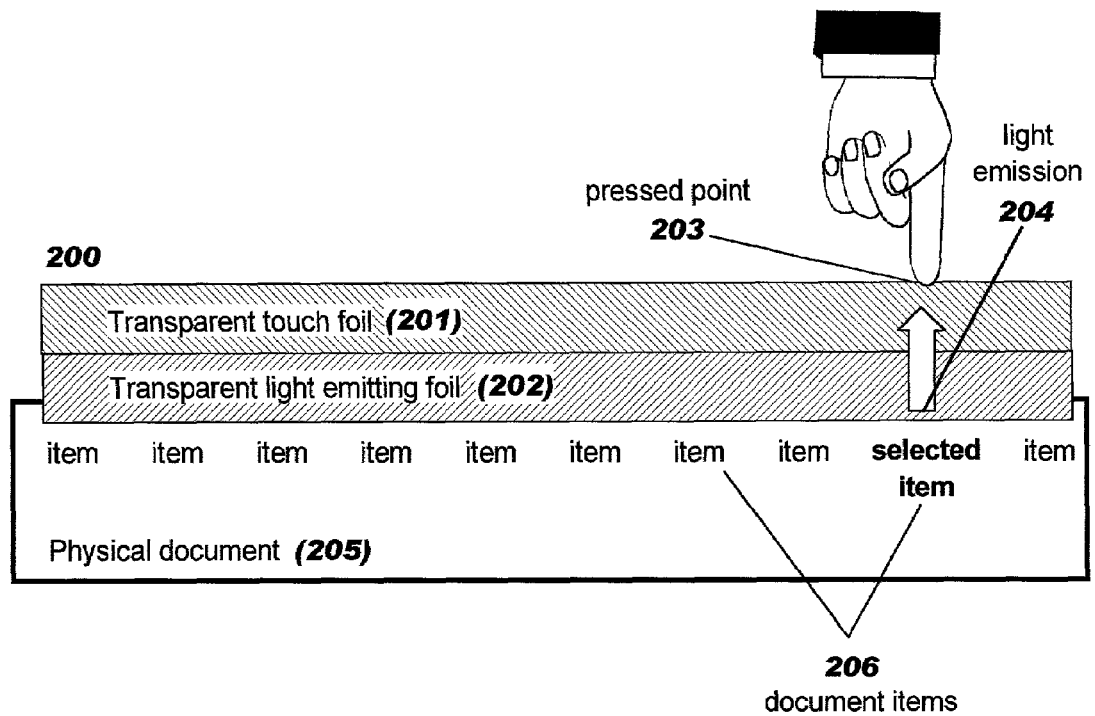
FIG. 2 shows the internal structure of the opto-touch foil.

FIG. 2 shows the cross section of an opto-touch foil (200), which includes:

- a transparent resistive or capacitive touch foil (201), of the type used commonly to manufacture touch screens wherein the generated signals are generally proportional to the coordinates of the point that is pressed or touched (203), and
- a transparent light emitting foil (202), which is a transparent, bright, self-emitting display that can emit light (204) from either one or both surfaces.

The combination of the foils (i.e., the touch foil stacked over the light emitting foil) forms an opto-touch foil (200). FIG. 2 represents an opto-touch foil placed and aligned over a physical document (205) comprising a plurality of items (206) (i.e., words, pictures, icons, etc.) printed (or written, painted, engraved . . . ) on its surface.

The touch foil component (201) may be made of transparent resistive or capacitive films of the type used commonly to manufacture touch screens. One example of appropriate touch foil technology is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company at http://www-.microtouch.com/.

Figure 3:
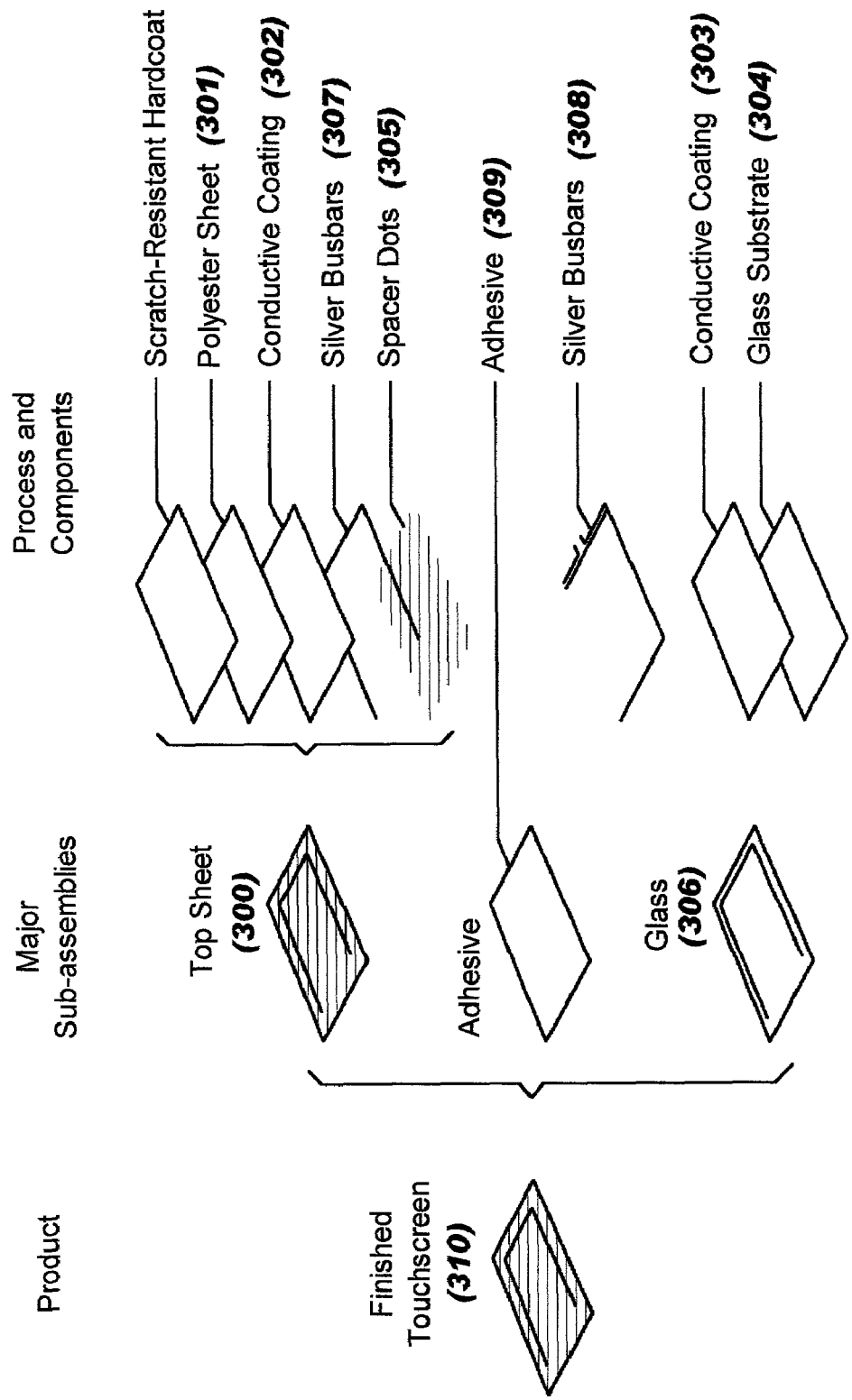
FIG. 3 shows an example of transparent touch foil technology.

As illustrated in FIG. 3, TouchTek4 touch screens (310) use a polyester sheet (301) with a conductive coating (302) as a vertical conductive electrode, providing one-half of a touch coordinate. The topsheet (300) is separated from the bottom layer, a glass substrate (304) with a conductive coating (303), by spacer dots (305). The bottom sheet (306) is attached to the topsheet (300) by an adhesive (309). The bottom sheet (306) forms the horizontal conductive electrode, generating the second half of the touch coordinate. Silver bussbars located on the topsheet (307) and on the bottom sheet (308) pass the touch coordinates to the touch-screen controller. Electronic control is provided by a serial controller, or by 4-wire controllers.

The transparent light emitting foil (202) may include an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of a suitable light emitting foil technology is the technology used for the TOLEDs manufactured by UNIVERSAL DISPLAY CORPORATION. The TOLED technology is fully described in the Web site of UNIVERSAL DISPLAY CORPORATION at:

http://www.universaldisplay.com/toled.html.

Figure 4:
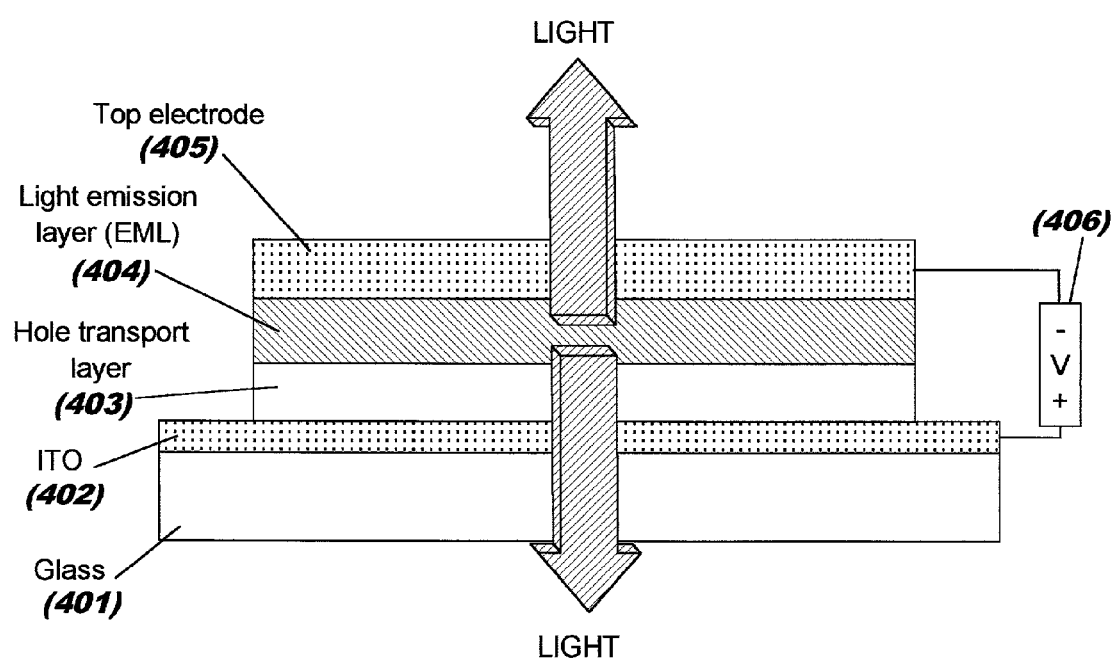
FIG. 4 shows an example of transparent light-emitting foil technology.

As illustrated in FIG. 4, in its most basic form, a TOLED is a monolithic, solid-state device consisting of a series of "small molecule" organic thin films sandwiched between two transparent, conductive layers. As a result, TOLEDs are bright, self-emitting displays that can be directed to emit from either or both surfaces. This is possible because, in addition to having transparent contacts, the organic materials are also transparent over their own emission spectrum and throughout most of the visible spectrum. Typically, a transparent conductive material (402), e.g., indium tin oxide (ITO), for hole-injection is deposited directly onto a glass substrate (401). Then, a series of organic materials are deposited by vacuum sublimation on the ITO layer: The first organic layer (403) serves as a hole-transporting layer (HTL) and the second layer (404) serves as both a light-emitting (EL) and electron-transporting layer (ETL). Finally, a transparent top contact (405) is deposited for electron injection on top of the organic films. When a voltage (406) is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light.

Since TOLEDs are thin-film, solid-state devices, they are very thin, lightweight and durable, and therefore ideal for portable applications. TOLEDs can be bottom, top, or both bottom and top emitting. Also, TOLEDs technology has attractive advantages regarding transparency (TOLED displays can be nearly as clear as the glass or substrate they're on and when built between glass plates, TOLEDs are more than 80% transparent when turned off), energy efficiency (for longer battery life), full viewing angle, bright and high contrast light emission, fast response time, and environmental robustness. Thus, TOLEDs are well suited for manufacturing the light emitting foil component used jointly with the touch foil according to the present invention.

User Workstation

The user workstation (103), (500) can be an Internet enabled cell phone (e.g., the NOKIA 7110 or the 9110i Communicator), a PDA, a TV monitor, a game console, an onboard computer, a network computer, an Internet appliance or any wireless IP enabled device, connected to the opto-touch foils (102) and (104). The user workstation is used for receiving from one opto-touch foil (102), (104) the coordinates of points pressed over the physical documents (101), (105) and for sending to these opto-touch foils (102), (104) the coordinates of the points to be highlighted. Opto-touch foils may communicate with the user workstation by means of a cable, a wire pair, an infrared link, or a wireless radio link.

In a particular embodiment of the invention, the user workstation (103) is used to access information and/or services stored locally or located on one or a plurality of servers (108) connected to the network (109). Preferably, the user workstation (500) is connected to the Internet network (501) and comprises a Web Browser application (503). Servers (505) are Web servers and the information or/and the service are Web pages hyperlinked to selected items (506) printed or engraved on the first physical document (509).

A hyperlink is activated by pressing either:
- the first opto-touch foil placed over or under the first physical document (509) at the point corresponding to the selected hyperlinked item (506). The location (513) associated with the hyperlinked item selected by the user is illuminated by means of the second opto-touch foil (512) placed over or under the second physical document (511); or
- the second opto-touch foil placed over or under the second physical document at the point corresponding to the location associated with the selected hyperlinked item. The selected hyperlinked item is illuminated by means of the first opto-touch foil placed over or under the first physical document (511).

Information and/or Service Access

When the user wants to select a particular portion of a physical document (102) (a page of a book for example), he places over (or under) this portion, a first opto-touch foil (101) and enters in the workstation the reference of this portion (the page number for example). In a preferred embodiment, the page number can be entered simply by touching some buttons marked on the top (or bottom) of the opto-touch foil (101). The page number may be also entered directly by means of the keyboard, the mouse or the touch screen of the user workstation, or by any other means such as a bar code reader, and so forth.

In a preferred embodiment, hyperlinked items (items that can be selected to be highlighted on a second physical document, preferably a map, or that can be used to access information on a server) on this page (106), are automatically illuminated and highlighted by the light emitting foil (101) placed on the surface of this page. This light emitting foil operates under the control of the user workstation (103). Illumination and highlighting allows the localization and identification of all hyperlinked items on the page selected by the user.

In order to highlight on a map the location of a hyperlinked item or to access a multimedia service associated with this hyperlinked item (102), the user touches with his finger or exerts a pressure on the portion of the opto-touch foil (101) placed over the hyperlink item he wishes to select (107).

The position of the hyperlinked item selected on the opto-touch foil is used to determine the position of this item on a second opto-touch foil (104) placed over (or under) a page of a second physical document (105), preferably a map. In a preferred embodiment, the position of the item selected in the first document is automatically highlighted (107) on this second physical document (105) by means of a luminous signal (or light spot) generated by the second opto-touch foil (104). The second opto-touch foil is under control of the user workstation (103).

The position of the hyperlinked item selected on the opto-touch foil is also used to identify and locate the server (108) and the information within this server the user wants to access. The user workstation (103) then accesses the identified server and retrieves and displays the information or/and service associated with the selected illuminated item. In the exemplary embodiment of the invention shown in FIG. 5, the user workstation (500) is connected to the Internet network (501).

The user workstation comprises a user interface (502) including a Web Browser (503) (also called "Web Client") to access the World-Wide-Web (WWW). In order to access the Web pages associated with an illuminated hyperlinked item (506) on a physical document (509), the user touches with his finger the opto-touch foil (507) over the illuminated item (508) he wishes to select. The position of the illuminated item selected on the opto-touch foil identifies the Web server (505) and the Web pages the user wants to retrieve and display. The Web Browser program (503) sends an HTTP request (504) to the identified Web Server (505). The response to the request (HTTP response) is sent by the Web Server (505) in the reverse direction to the Web Browser (503). The HTTP response comprises the requested Web pages associated with the selected illuminated item.

Method for Creating Hyperlinks on a Physical Document

In general terms, the method of creating hyperlinks from items (506) on a first physical document (509) to particular points (513) on a second physical document (511), includes the steps of creating a hyperlink table (510) for the first physical document (509), and receiving and storing in the hyperlink table (510) an identification of the first physical document (509); and, for each page of the first physical document (509):
- receiving and storing in the hyperlink table (510) an identification of the page and an identification of hyperlinked items (506) defined on the page;
- associating to each hyperlinked item (506) referenced in the first physical document (509), a point on a page of a second physical document (511);
- storing (703) in the hyperlink table (510) for each hyperlinked item (513), absolute coordinates of the associated point. The absolute coordinates are preferably the geographic coordinates of the associated point represented in the second physical document (longitude/latitude of the location) if this document is a map;
- determining the position of points pressed on an opto-touch foil (507); the opto-touch foil being placed and aligned over or under the page of the first physical document (509); the opto-touch foil being pressed at points corresponding to the position of the defined hyperlinked items (506); and
- storing the position of the points pressed in the hyperlink table (510), the hyperlink table comprising for each hyperlinked item, an indication of its position on the page of the first physical document.

The method may further include the steps of computing from the absolute coordinates, foil coordinates corresponding to the position on a second opto-touch (512) foil placed and aligned over or under the second physical document (511), of each point associated with an hyperlinked item (506); and storing the foil coordinates in the hyperlink table (510).

In a particular embodiment, the present method may further include a step for creating hyperlinks from items (506) on the first physical document (509) to information or services located on the user system (500) or on one or a plurality of servers (505). This further step includes receiving and storing in the hyperlink table (510) an identification and a location of information or service associated with each defined hyperlinked item.

Figure 7:
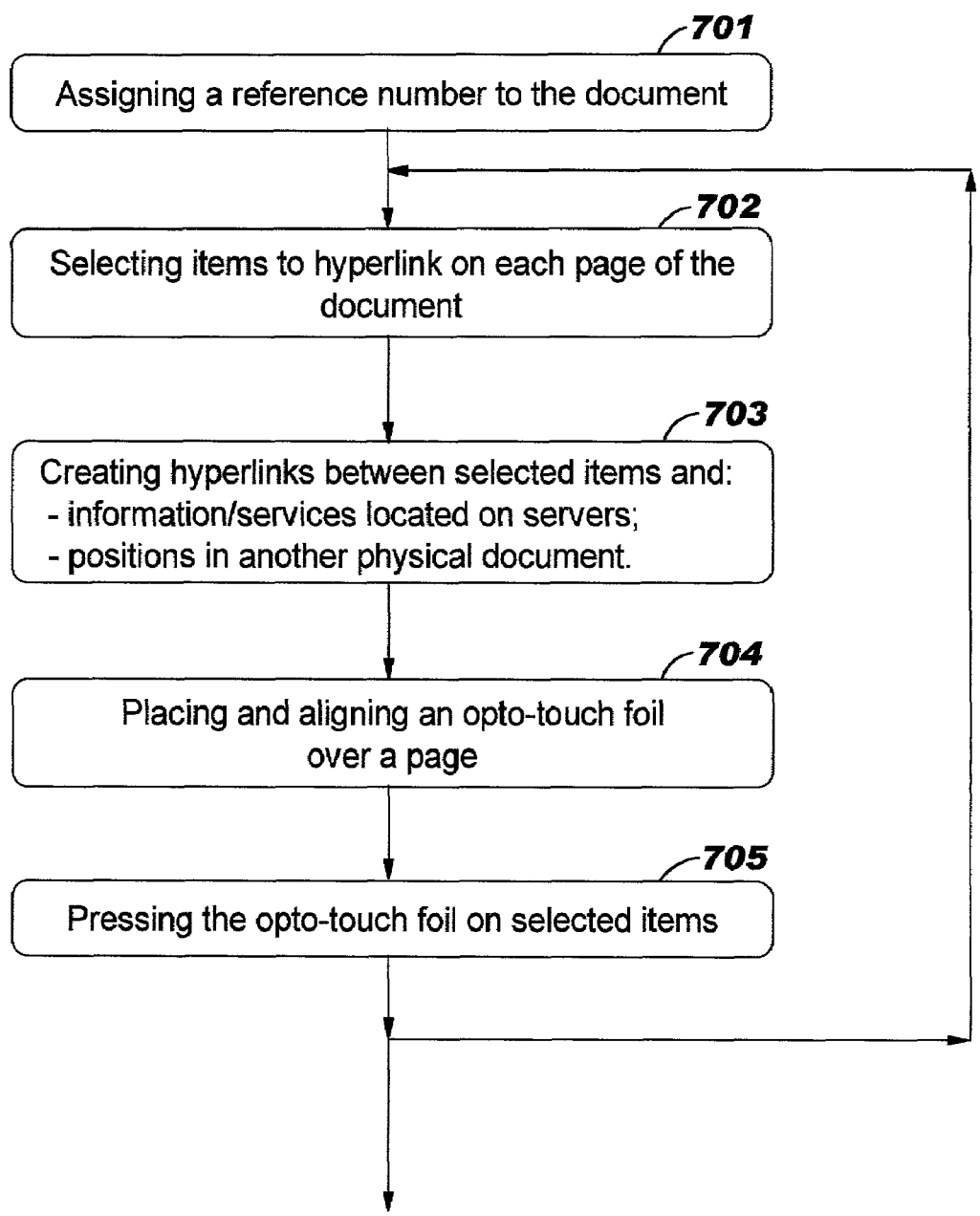
FIG. 7 shows a flowchart of the method of creating hyperlinks on physical documents.

FIG. 7 shows a method for creating hyperlinks from a first physical document (hand written or printed document like the document shown in FIG. 6 entitled "*Travel Guide to the Balkans*"), to a second document (preferably a paper map) and for highlight the positions of referenced locations on this second document. This method comprises the steps of: (701) assigning a reference number (identifier) to the physical document; and for each page of the first physical document document (or portion of the document):

(702) selecting items on the page;

(703) creating hyperlinks between the selected items and particular points on the second physical document using a hyperlink table;

(704) placing and aligning an opto-touch foil over the page;

(705) pressing the opto-touch foil over the selected items; and (706) reading and storing in the hyperlink table the position (foil coordinates) on the opto-touch foil of the selected items on this page.

In an exemplary embodiment, the step of creating hyperlinks (703) may be instead: creating hyperlinks between the selected items and information or services located on the user system or on one or a plurality of servers.

As shown in FIG. 6, the user assigns a document number to each document he receives (e.g., 387) for identifying the document, writes the reference number on the document, and creates a hyperlink table associated with the document and accessible from the user workstation. The hyperlink table includes the reference number of the document and other information relevant to the document such as title, author, ISBN (International Standard Book Number), date, and so forth. The hyperlink table may be stored within the user workstation or may be stored in an external memory accessible from the user workstation.

The header of the new created hyperlink table associated with the document shown in FIG. 6, can be built as follows:

| Doc: 0387 | Title: "Travel Guide to the Balkans" | Author: Bosiljko Vasilj Medjugoje, Bosnia & Herzegovina Phone: (387-88) 650-055 | |
|---|---|---|---|
| Calib. Location: | Date: 28/01/2000 URL: | ISBN: 84-344-0856-2 Map Scale: | Foil Resolut. |

As shown in FIG. 8, each time the user wants to create hyperlinks for items (801) located on a page of a first physical document, he enters the page number (802) where the items are referenced in the hyperlink table of the first physical document (e.g., 16). He then associates with each item on this page, the absolute coordinates associated with the location of the item on the second physical document. If the second physical document is a geographic map and if the item refers to a location, the user enters the geographic coordinates (longitude/latitude) of this location.

In an exemplary embodiment, the present method further includes steps for creating hyperlinks from an item (506) on the first physical document (509) to information or services located on the user system (500) or on one or a plurality of servers (505). In this case, the user associates with each item on this page a destination address within the communication network. This destination address identifies a server connected to the communication network and the information and/or services within this server the user wants to access. The user then enters the destination address associated with this item (e.g., an URL address) in the hyperlink table.

In a preferred embodiment, the hyperlink table associated with the page shown in FIG. 8, appears as follows:

| Doc: 0387 | | Title: "Travel Guide to the Balkans" Date: 28/01/2000 | Author: Bosiljko Vasilj Medjugoje, Bosnia & Herzegovina Phone: (387-88) 650-055 ISBN: 84-344-0856-2 | |
|---|---|---|---|---|
| Calib. Location: Pg: 16 | | URL: | Map Scale: | Foil Resolut. |
| LOCATION | FOIL 1 X/Y | HYPERLINK | LAT/LONG | FOIL 2 X/Y |
| Zagrev | | http://www.interconti.com/croatia/zagreb/hotel_zagic.html | N 045° 36' 04" E 016° 12' 20" | |
| Karlovak | | http://www.hr/hrvatska/HRgradovi/Karlovac/uvod-en.htm | N 045° 28' 17" E 015° 43' 35" | |
| Knin | | http://www.sibenik-knin.com/ | N 044° 03' 21" E 016° 15' 26" | |
| Hotel Bellevue | | http://www.tel.hr/np-plitvice/smje/bellevue.htm | N 044° 18' 46" E 015° 45' 06" | |
| Slunj | | http://mx1.xoom.com/slunj/ | N 045° 13' 53" E 015° 40' 18" | |
| Plitvice | | | N 044° 52' 38" E 015° 44' 37" | |
| Udbina | | http://www.aiha.com/english/partners/biozad/zdkn.htm | N 044° 31' 19" E 015° 45' 22" | |
| Gracac | | http://www.crotours.com/English/Beauties/Parks/velebit.htm | N 044° 21' 07" E 015° 48' 36" | |

The information or service associated with the hyperlinked item may be stored locally in the user workstation. In this case, an identification within the user workstation of the information or service (local address, file name, exec name, or the like) is entered in the hyperlink table.

Figure 9:
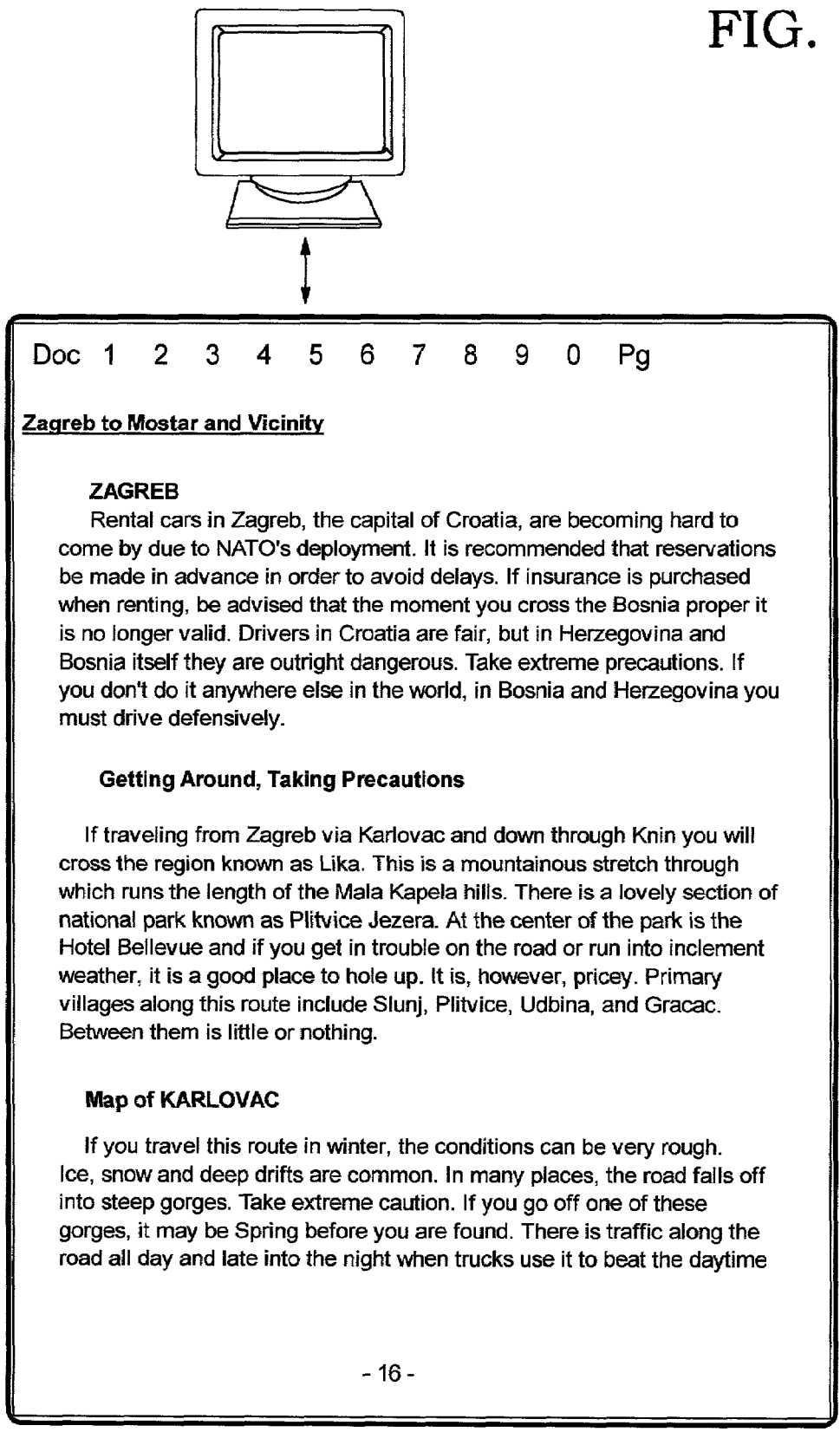
FIG. 9 shows how the opto-touch foil is placed and aligned over the page of the physical document.

As shown in FIG. 9, after the hyperlinked items of a page have been defined in the hyperlink table associated with the document, the opto-touch foil is placed over (or under) the page, and aligned with the borders of this page by conventional means (e.g., by adjusting the upper left corner of the opto-touch foil with the upper left corner of the page).

Figure 10:
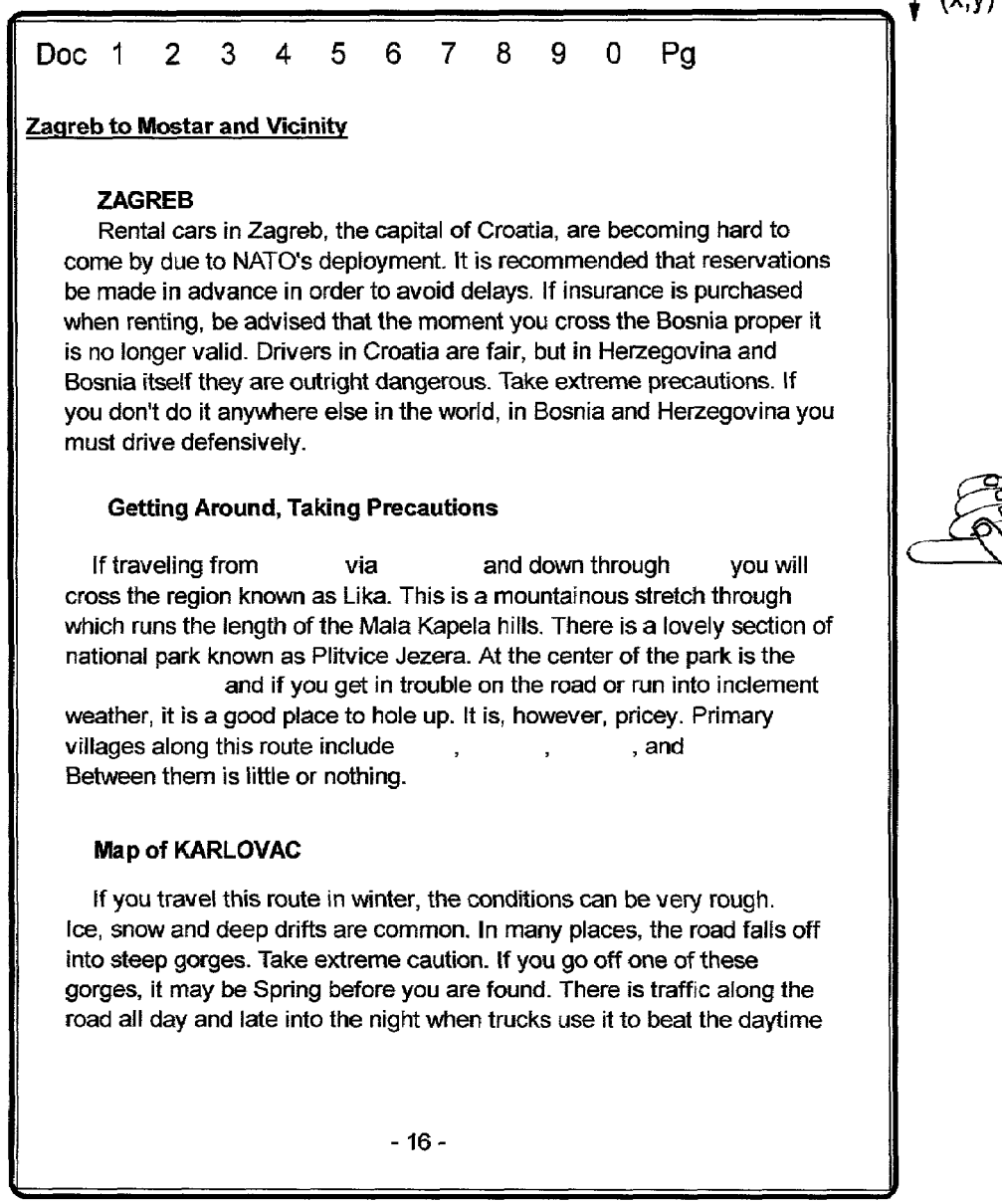
FIG. 10 shows how the user presses the opto-touch foil on a selected item to create an hyperlink.

As shown in FIG. 10, for each item previously selected on the page ("Zagreb", "Knin", "Hotel Bellevue". "Slunj", "Plitvice". "Udvina", "Gracac"), the user presses (e.g., by the finger tip) the opto-touch foil on the corresponding item to determine the position (for instance, the coordinates of the item on the opto-touch foil) of this item on the page. Once the measure of the foil coordinates of each selected item (hyperlinked item) on the page is completed, the hyperlink table is updated as follows:

the method of locating, visualizing and highlighting hyperlinked items, of activating hyperlinks and of accessing information and/or services directly from these hyperlinked items highlighted on the pages of a physical document includes the steps of:

(1101) selecting a physical document by entering the reference number of this document;

(1102) selecting a page of the physical document;

(1103) identifying for the selected page the position of predefined hyperlinked items referring to a hyperlink table associated with the selected physical document, the hyperlink table comprising for each page of the physical document, a list of hyperlinked items, and for each hyperlinked item, an indication of the position on an opto-touch foil;

| Doc: 0387 | | Title: "Travel Guide to the Balkans" | Author: Bosiljko Vasilj Medjugoje, Bosnia & Herzegovina Phone: (387-88) 650-055 | |
|---|---|---|---|---|
| | | Date: 28/01/2000 | ISBN: 84-344-0856-2 | |
| Calib. Location: Pg: 16 | | URL: | Map Scale: | Foil Resolut. |
| LOCATION | FOIL 1 X/Y | HYPERLINK | LAT/LONG | FOIL 2 X/Y |
| Zagrev | 125 110 | http://www.interconti.com/croatia/ zagreb/hotel_zagic.html | N 045° 36' 04" E 016° 12' 20" | |
| Karlovak | 170 110 | http://www.hr/hrvatska/HRgradovi/ Karlovac/uvod-en.htm | N 045° 28' 17" E 015° 43' 35" | |
| Knin | 190 110 | http://www.sibenik-knin.com/ | N 044° 03' 21" E 016° 15' 26" | |
| Hotel Bellevue | 35 155 | http://www.tel.hr/np-plitvice/ smje/bellevue.htm | N 044° 18' 46" E 015° 45' 06" | |
| Slunj | 145 180 | http://mx1.xoom.com/slunj/ | N 045° 13' 53" E 015° 40' 18" | |
| Plitvice | 170 180 | | N 044° 52' 38" E 015° 44' 37" | |
| Udbina | 195 180 | http://www.aiha.com/english/ partners/biozad/zdkn.htm | N 044° 31' 19" E 015° 45' 22" | |
| Gracac | 215 180 | http://www.crotours.com/English/ Beauties/Parks/velebit.htm | N 044° 21' 07" E 015° 48' 36" | |

For example, on page 16 of document 387 entitled "*Travel Guide to the Balkans*" written by "Bosiljko Vasilj Medjugoje, Bosnia & Herzegovina, Phone: (387-88) 650-055" the foil coordinates of the hyperlinked item "Slunj" on the document are X=145/Y=180. This hyperlinked word "Slunj" points to the URL address: http://mx1.xoom.com/slunj/. This item also points to a location, named "Slunj" with absolute coordinates (geographic coordinates) N 045° 13' 53" (latitude) and E 015° 40' 18" (longitude). Using the method herein described for the different pages of a same document, the hyperlink table of the complete document is built.

Several types of multimedia services can be defined in the hyperlink table using different types of codes to identify service names and service addresses (e.g., http:// address to access an URL address on the Internet; Phone:// address to make a phone call, etc.). All these multimedia services can be accessed and retrieved from the Web simply by touching the opto-touch foil over the corresponding items highlighted on the hard-copy document.

Method for Activating Hyperlinks From a Physical Document

Figure 11:
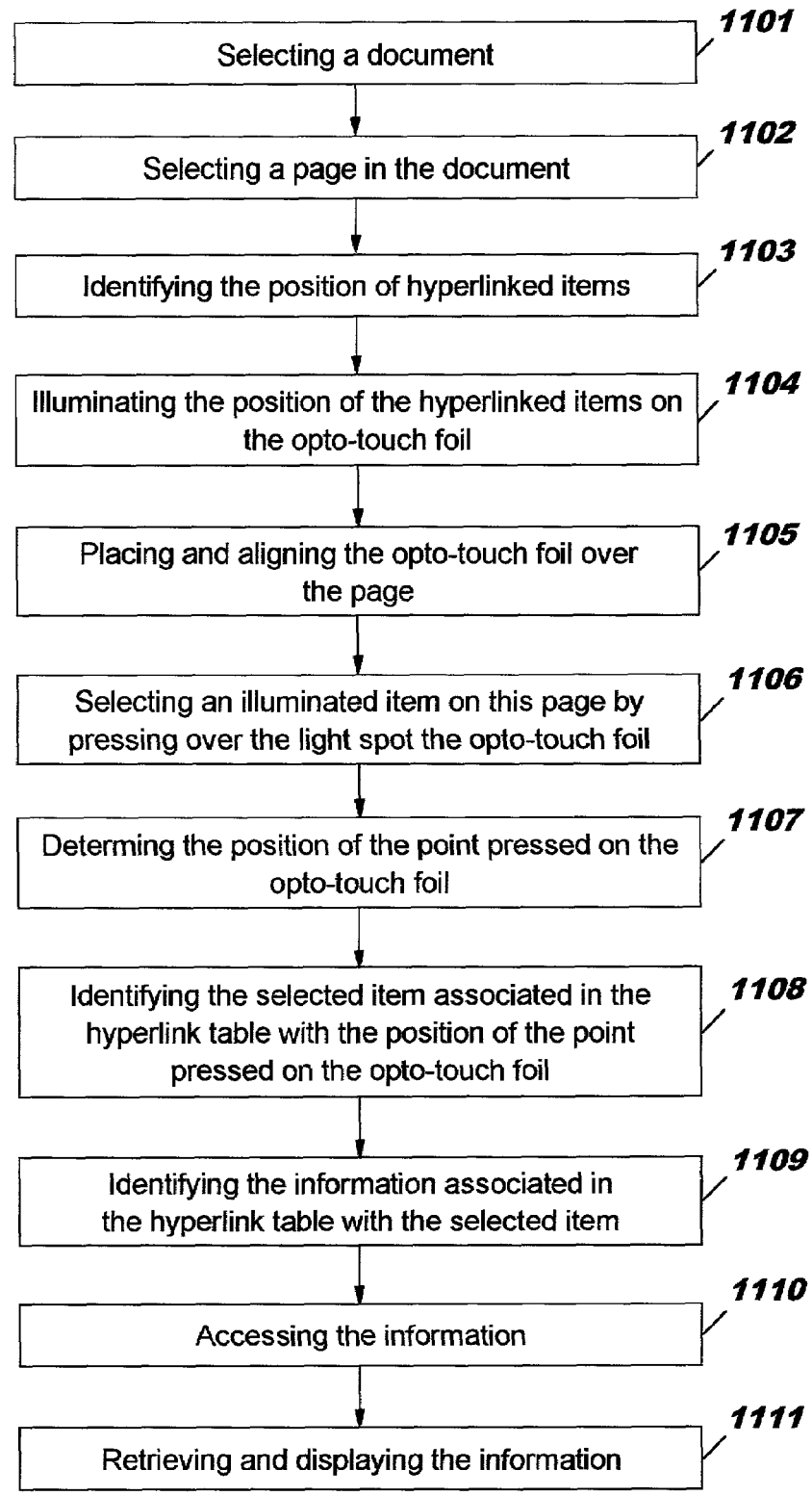
FIG. 11 shows the method of triggering hyperlinks by touching highlighted items from a physical document.

The user receives a hand written or printed document, like the document entitled "*Travel Guide to the Balkans*", (Doc: 387) shown in FIG. 6. Hyperlinks have been previously defined from items selected on pages. As shown in FIG. 11, (1105) placing and aligning the opto-touch foil over (or under) the selected page;

(1106) selecting a hyperlinked item on this page by pressing the opto-touch foil on the point (light spot) corresponding to the item;

(1107) determining the position of the point pressed on the opto-touch foil;

(1108) identifying the selected hyperlinked item referring to the hyperlink table, this hyperlink table comprising an indication of the position of each hyperlinked item on the selected page of the document;

(1109) identifying the information or/and the service associated with the selected illuminated item referring to the hyperlink table, this hyperlink table comprising for each illuminated item of the selected page the identification of the requested information and/or service within the user workstation or within the network (preferably by means of a destination address);

(1110) accessing the information and/or service; and (1111) retrieving and displaying this information and/or service on the user workstation.

In a particular embodiment, the method of activating hyperlinks may further include step of (1104) illuminating (or visualizing, or highlighting) the position corresponding to each of the predefined hyperlinked item using the opto-touch foil connected to the user workstation.

Figure 12:
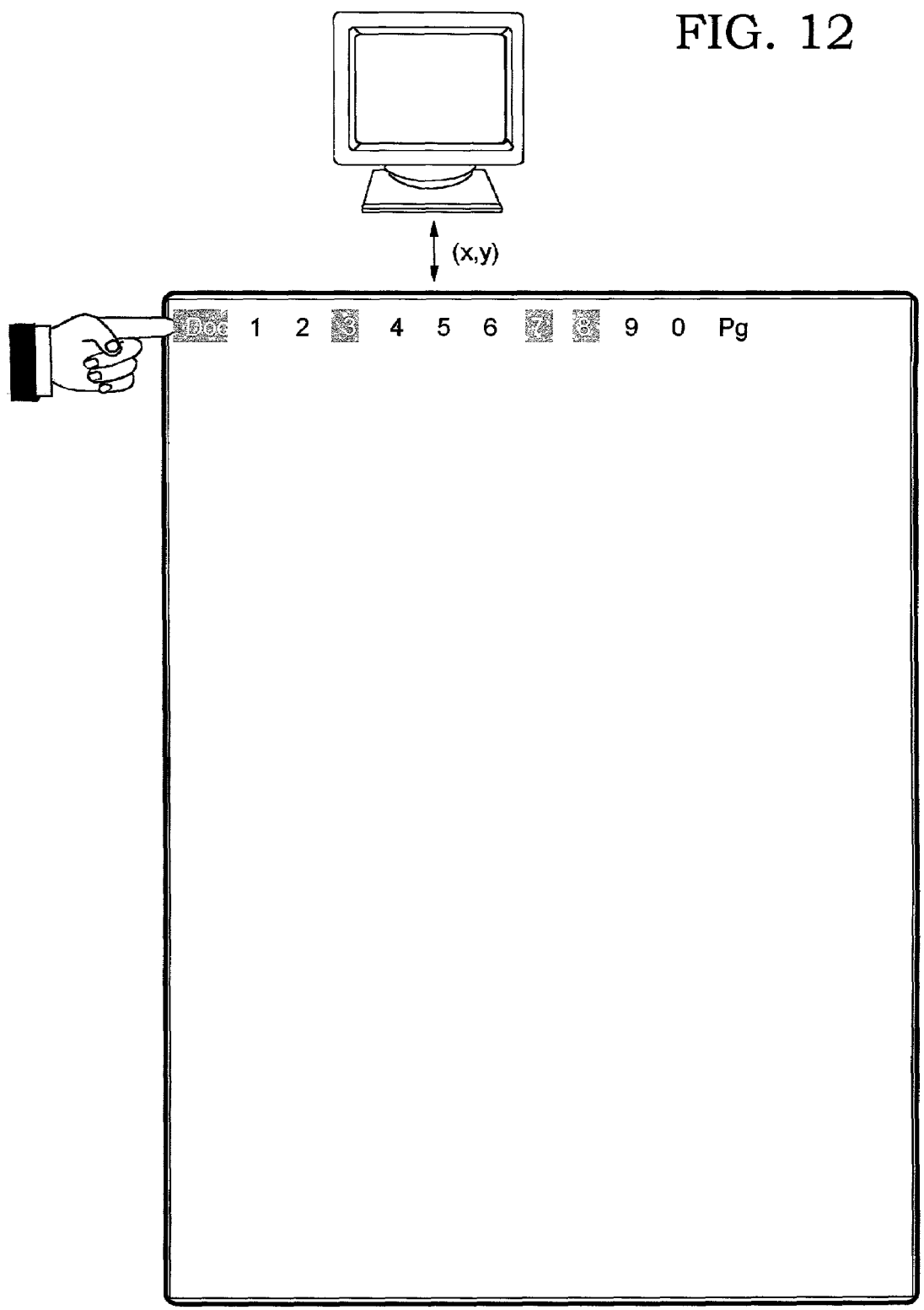
FIG. 12 shows how to use the opto-touch foil to enter the document reference number.

(1101) Entering the reference number of the document: By means of any user interface (keyboard, mouse, touch screen, etc.) or any reading means (bar code reader, etc.), the user enters the reference number (identifier) of the document (e.g.: document 387) he wants to select. In the particular embodiment shown in FIG. 12, the user enters the reference number of the document (e.g.: Doc: 387) by means of an array of pressure sensible "touch buttons" printed on the top of the opto-touch foil. The user presses in the following order: touch button marked "Doc, and then numerical touch buttons corresponding to each digit of the document reference number (e.g., "3", "8" and "7"). This procedure gives access to the hyperlink table associated with the selected document.

Figure 13:
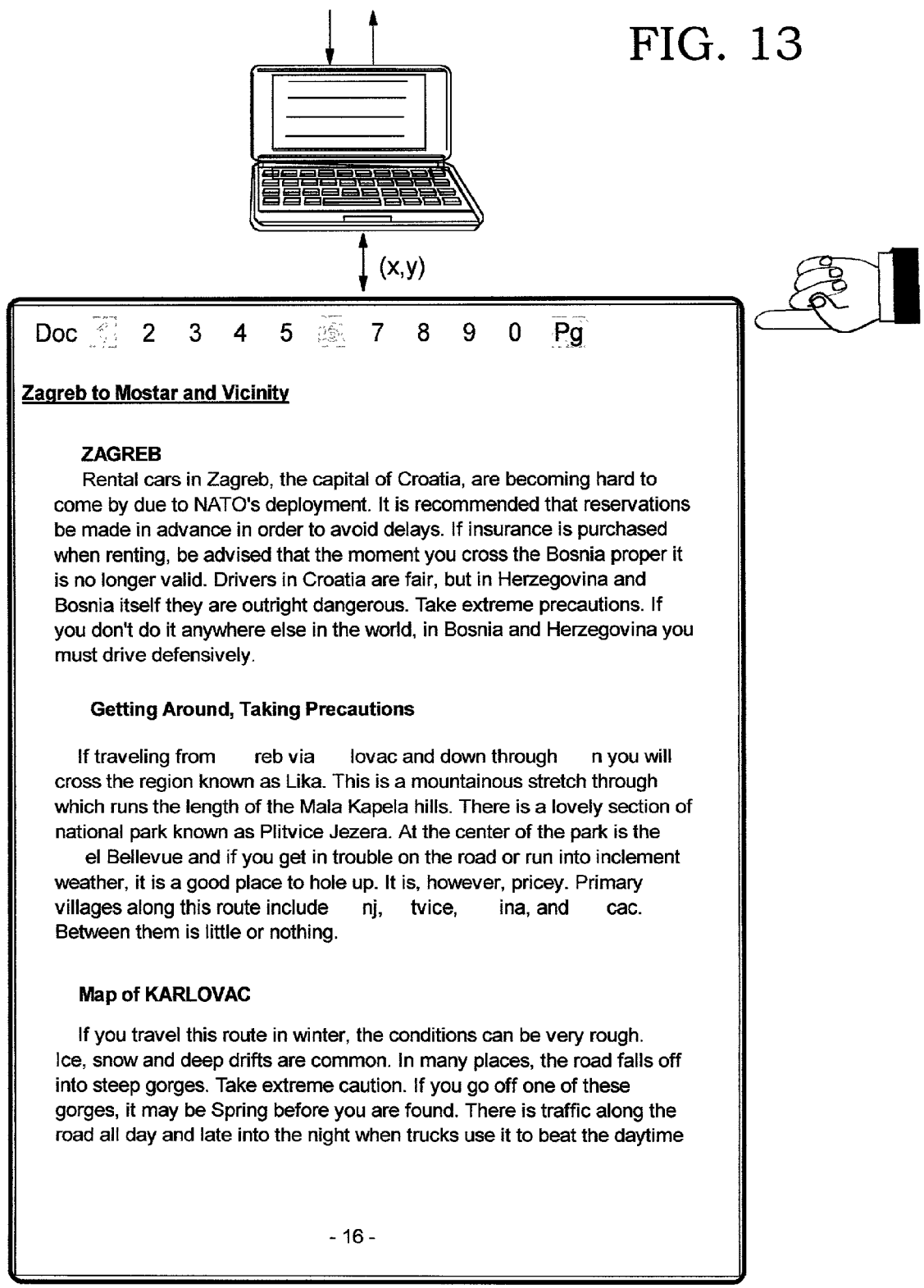
FIG. 13 shows how to use the opto-touch foil to enter a page number and how selected items are illuminated.

(1102) Selecting a page and highlighting hyperlinks on this page: By means of any user interface (keyboard, mouse, touch screen, etc.) or any reader (bar code reader, etc.), the user enters the page of the document (or the portion of the document) (e.g.: page 16) he wants to select. In the illustrative embodiment shown in FIG. 13, by using the array of pressure sensible touch buttons printed on the top of the opto-touch foil, the user enters the page number to select (e.g.: Pg. 16). The opto-touch foil can be on any position (normally the opto-touch foil is placed over the page comprising the hyperlink to trigger). The user presses in the following order: a touch button marked as "Pg", and then numerical touch buttons corresponding to each digit of the page number (e.g., "1" and "6") to select. This procedure gives access to the selected page (e.g., Pg. 16) within the hyperlink table associated with the selected document (e.g., Doc: 387).

(1103) Identifying the position of predefined hyperlinked items referring to the hyperlink table: The position (coordinates X and Y) of all the hyperlinked items previously defined for the page selected by the user are retrieved from the hyperlink table and sent by the user workstation to the opto-touch foil.

(1104) Illuminating the position corresponding to each of the predefined hyperlinked item: The opto-touch foil receives the information sent by the user workstation. This information comprises the position (coordinates X and Y) of each hyperlinked item defined on the selected page. The opto-touch foil decodes this information and visualize (highlights or illumines) the position of each of the hyperlinked items.

(1105) Placing and aligning the opto-touch foil over the selected page of the document: Once a document and a page have been selected, the opto-touch foil generates one or more light spots signaling that one or more hyperlinks have been defined for this page. Then, the opto-touch foil is placed over (or under) the page, and aligned with the borders of the selected page by conventionally means (e.g., by adjusting the upper left corner of the touch foil with the upper left corner of the page). As shown also on FIG. 13, the opto-touch foil is placed and aligned over the selected page. The positions of the light spots emitted by the opto-touch foil correspond to the positions of the hyperlinked items defined for this page. The hyperlinked items appear through the transparent opto-touch foil and are identified by the user by the light spots emitted by the opto-touch foil.

Figure 14:
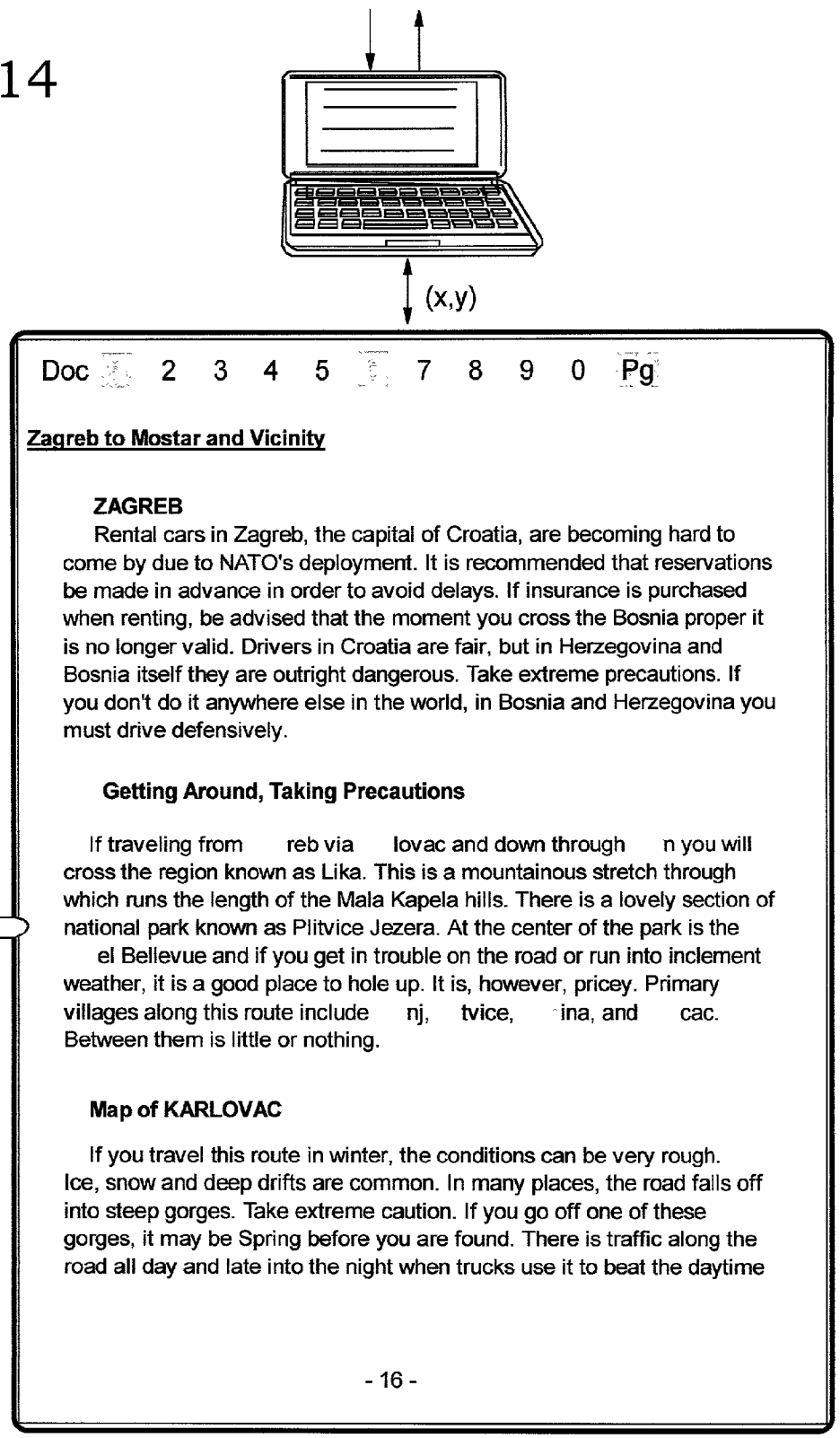
FIG. 14 shows how the user presses the opto-touch foil on illuminated items.

(1106) Selecting an illuminated item on this page: As shown in FIG. 14, the user selects a (hyperlinked) item ("Hotel Bellevue") on the page by pressing (e.g., by his fingertip) the opto-touch foil on the illuminated point corresponding to the selected item.

(1107) Determining the position on the page of the point pressed on the opto-touch foil: The opto-touch foil sends a signal to the user workstation to identify the selected item. This signal indicates the position on the page of the point that has been pressed by the user on the opto-touch foil. The generated signal is generally proportional to the coordinates (X/Y) of the point that has been pressed. In our example, the opto-touch foil measures the position on the page of the point that has been pressed (near the light spot over the word "Hotel Bellevue") by the user. The coordinates that are measured at this point are around X=35 and Y=155.

(1108) Identifying the Selected Item: The illuminated item selected on the opto-touch foil by the user is identified through to the hyperlink table. The hyperlink table comprises an indication of the position (coordinates X and Y) of each illuminated item on each page of the document. In our example, the coordinates measured by the opto-touch foil are approximately X=35 and Y=155. They correspond in the hyperlink table to the hyperlinked item "Hotel Bellevue". The hyperlink table is either stored locally in the user workstation, or is retrieved from a remote server and then stored locally in the user workstation or is stored in a remote server and is accessed remotely.

(1109) Identifying the information associated with the selected item: The hyperlink table includes for each hyperlinked (illuminated) item of each page of the document the location within the network of the requested information and/or service. The information and/or service may be located by a destination address. In the Internet network, Web pages in Web Servers are identified by a URL (Uniform resource Locator). In our example, the hyperlink table associates the illuminated item "Hotel Bellevue" with the URL: http://www.tel.hr/np-plitvice/smje/bellevue.htm.

(1110) Accessing the information and/or service: The user workstation Web triggers the hyperlink (destination address, URL, or the like) associated in the hyperlink table with the identified selected item. In our example, the hyperlink labeled "Hotel Bellevue" is triggered since the system determines from the hyperlink table that, for this page (i.e., Pg. 16), X=35, Y=155 are the coordinates of the nearest hyperlink to the sensed position. Thus, in this example, a simple pressure near the illuminated item "Hotel Bellevue" will automatically trigger the following hyperlink on the Web: http://www.tel.hr/np-plitvice/smje/bellevue.htm.

(1111) Retrieving and displaying the requested information and/or service: The information contained at the selected destination address (URL) can be displayed on the user workstation. As shown in FIG. 15, additional information (e.g., document number, page number, hyperlinked item, foil coordinates and URL) related to the hyperlinked (illuminated) item selected by the user can be shown on the Web Browser along with the information retrieved from the Web Server.

Method for Highlighting on a Second Physical Document Locations Referenced in a First Physical Document In general terms, the illumination of locations related to items referenced in a first physical document (509), on a paper map (more generally on a second physical document) (511) can be described as follows. First, the user selects a paper map (511) covering the geographic area of the locations the user wants to highlight. The user places and aligns this paper map under an opto-touch foil (512). He enters the map scale in his workstation (500). To calibrate the opto-touch foil (512), the user selects on his workstation the "geographic link" of a particular location (calibration location) (514) represented on the paper map (511). The opto-touch foil (512) is calibrated by pressing the opto-touch foil on the particular location (514). As soon as this operation is executed, the location of each item (506) in the first physical document (509) for which a hyperlink ("geographic link") is defined, is automatically highlighted on the paper map by means of spots of light (513) emitted by the opto-touch foil (512). Each time the user activates a hyperlink ("geographic link") on the first physical document (509), the spot of light corresponding to this location blinks on the paper map.

In a preferred embodiment, when a location is selected (by touching) either on its illuminated position on the paper map or on the illuminated hyperlinked item on the first physical document, the Web Browser (503) sends an HTTP request (504) to the Web Server (505) identified in the hyperlink table (510). A response (HTTP response) is sent back by the Web Server (505) in the reverse direction to the Web Browser (503). The HTTP response comprises the requested Web page associated with the selected illuminated item (place name on the first physical document) or with the illuminated location (on the paper map).

The Opto-touch Foil is Calibrated as Follows:

On a terrestrial meridian, one meter corresponds (very approximately) to an arc of:

$F=(90\times60\times60)/10{,}000{,}000=0.0324(''/m)$ (i.e., seconds of arc per meter)

Let, by definition, Fr (mm/unit) be the resolution of the touch foil (i.e., the number of mm over axis X and Y (510) of the touch-foil that correspond to each unit of sensed signal, e.g., mVolts, assuming it is the same for both axis); and Let Ms be the scale of the map (i.e., the number of terrestrial meters over the reference meridian per each mm measured on the map).

From the above definitions, parameter K is defined by the formula:

$K=F\times Fr\times Ms(''/pulse)$

Let LATc and LONc, be the latitude and longitude of a calibration location selected on the Web page (measured in seconds of arc), Let Xc, Yc be the coordinates measured by the touch foil when the user presses on the calibration location on the map, and Let LATo, LONo be the latitude and longitude on the map corresponding to the origin of the coordinates on the touch foil (i.e., to the point on the touch foil for which X=0 and Y=0).

The equations are:

$LATo=LATc+K\times Yc$ $LONo=LONc-K\times Xc$

Once LATo and LONo are known, the foil coordinates also called relative coordinates (Xp, Yp) of any point P with latitude and longitude, LATp, LONp, (measured in seconds of arc) can be computed as follows:

$Xp=(LONp-LON0)/K$ $Yp=(LAT0-LAPp)/K$

"Geo-links" are included in the Hyperlink Table as follows: When the hyperlink table of a first physical document is accessed, the "geographic" information comprised in the hyperlink table (i.e., locations names, absolute/geographic coordinates and hyperlinks) is retrieved and stored in the user workstation. (See in the next table, the first four columns of the hyperlink table generated from the above example). Once a second opto-touch foil (foil 2 with a known resolution Fr) and a second physical document (for example a paper map with a known map scale Ms) have been selected, and once the calibration procedure is achieved (by sensing the foil 2 coordinates (Xc, Yc) of the calibration location and by using the formulas described here above), the foil 2 coordinates (FOIL 2 X/Y) of the locations related to the items referenced in the first physical document are computed (see the last column on the next table). The hyperlink table of the first physical document is completed with the foil 2 coordinates (FOIL 2 X/Y) of all "geo-linked" locations. The foil 2 coordinates are transmitted from the user workstation to the second opto-touch foil that decodes them. They are then used to illuminate on the second physical document the position of the locations related to the items referenced in the first physical document.

The method of calibrating and displaying one or more locations related to items referenced in a first physical document on a second physical document (for example a paper map), using an opto-touch foil placed over this second physical document, includes the steps of:

reading from the hyperlink table the absolute coordinates (geographic coordinates such as latitude/longitude) associated with the items referenced in the first physical document;

selecting a second physical document including (i.e., representing) at least the location of one item referenced (i.e., hyperlinked) in the first physical document;

identifying the scale of this second physical document;

placing an opto-touch foil aligned over or under the second physical document;

selecting a calibration location, this step comprising the step of selecting an item referenced on the first physical document and corresponding to a location represented in the second physical document;

calibrating the opto-touch foil by pressing the opto-touch foil on the selected calibration location;

highlighting by means of the opto-touch foil the points on the second physical document corresponding to the items referenced in the first physical document;

selecting an highlighted point on the second physical document by pressing the opto-touch foil on this point;

highlighting on the first physical document the referenced item corresponding to the selected highlighted point on the second physical document;

identifying the position on the second physical document of an item referenced on the first physical document by pressing the first opto-touch foil on the point corresponding to the referenced item; and making the point blink on the second physical document.

The following example illustrates the present method for locating places of any kind, using conventional paper maps, in accord with information provided on physical documents. A driver with a WAP enabled cell phone (like the one shown in FIG. 1) is traveling across the Balkans. At some point on the way from Zagrev to Karlovac, the user, with his cell phone, access a Web page on:

http://www.imisite.org/berserk/dalmatia.html.

This Web page provides tourist information, and in particular a publication entitled: "Travel Guide to the Balkans (Document. 378)", illustrated on FIG. 6. This publication describes the region the driver intends to visit that day. On page 16 of this document, as illustrated on FIG. 8, the driver finds an interesting reference describing several places on his route. The driver then takes a paper map of the region and tries to locate on the map the places referenced on this page of the travel guide. FIG. 16 shows the paper map of the region and the document referencing some geographic locations.

Glancing over the map, the driver locates several places referenced on page 16 of the document, like Karlovac, Knin, Udbina and Gracac. However, he cannot locate other referenced places, like Zagrev, Hotel Bellevue, Slunj and Plitvice. Motivated by the title and the content of the section "Getting Around, Taking Precautions", the driver is particularly interested to determine the location on his route of the "Hotel Bellevue".

Figure 1:
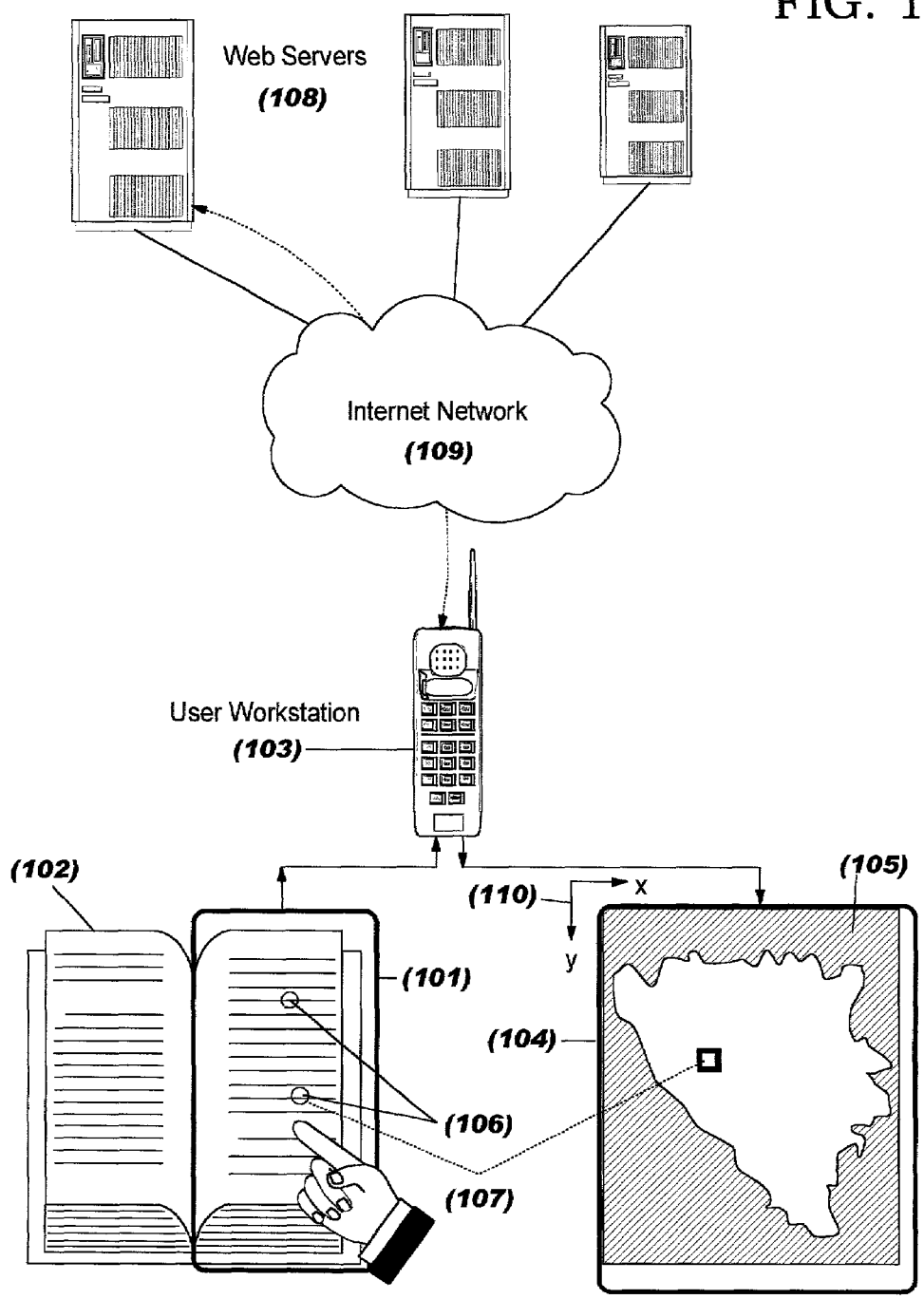
FIG. 1 shows the main components of the invention.
Figure 17:
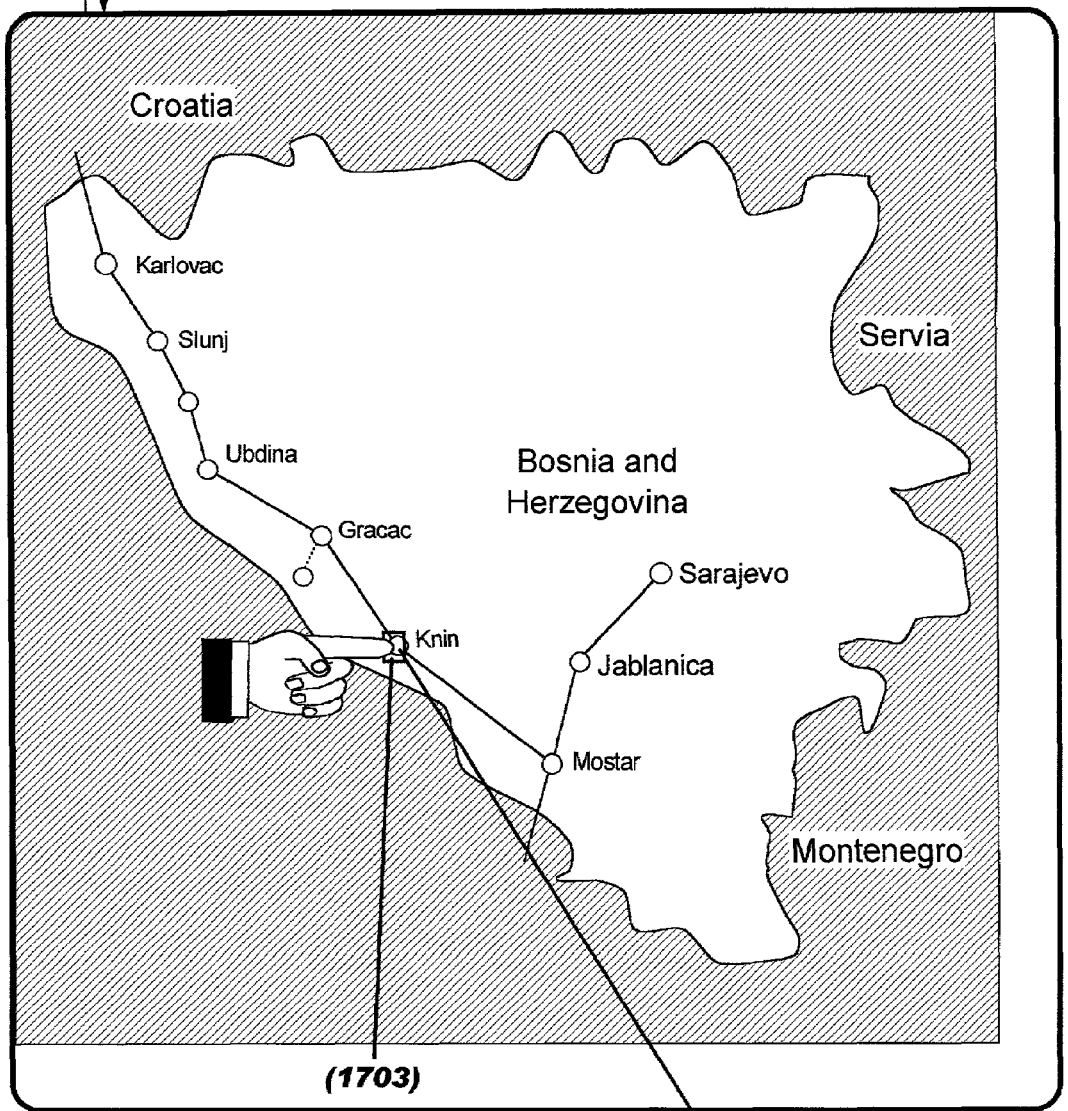
FIG. 17 shows how a physical map is calibrated.

To locate on the map all places referenced (i.e., the "geographic links") on this page (and more particularly, the "Hotel Bellevue"), as illustrated on FIG. 1, the user connects an opto-touch foil (104) to his cell phone (103) and places the map (105) underneath the opto-touch foil. Then the following tasks are performed: i) Calibrating the opto-touch foil: The calibration of the opto-touch foil is illustrated in FIG. 17. To calibrate the opto-touch foil, the user:

- calls the opto-touch foil calibration procedure (1700) from his workstation;
- enters the scale of the map scale (1701) (e.g., 1/1,250,000);
- selects as calibration location (1702), from the list of locations shown on the display of his workstation, any location (e.g. Knin) that corresponds to a point represented on the map. To maximize the precision of this calibration, it is advisable to choose, among all the locations displayed at the same time on the workstation and represented on the map, a location positioned far from both foil axes (i.e., far from axis X, and far from axis Y) or, equivalently, relatively close to the diagonal axis X=Y and far from the foil origin point X=Y=0.
- presses the opto-touch foil (e.g., by using a pencil) on the point of the map where the selected calibration location (1703) is located (i.e., Knin).

Figure 19:
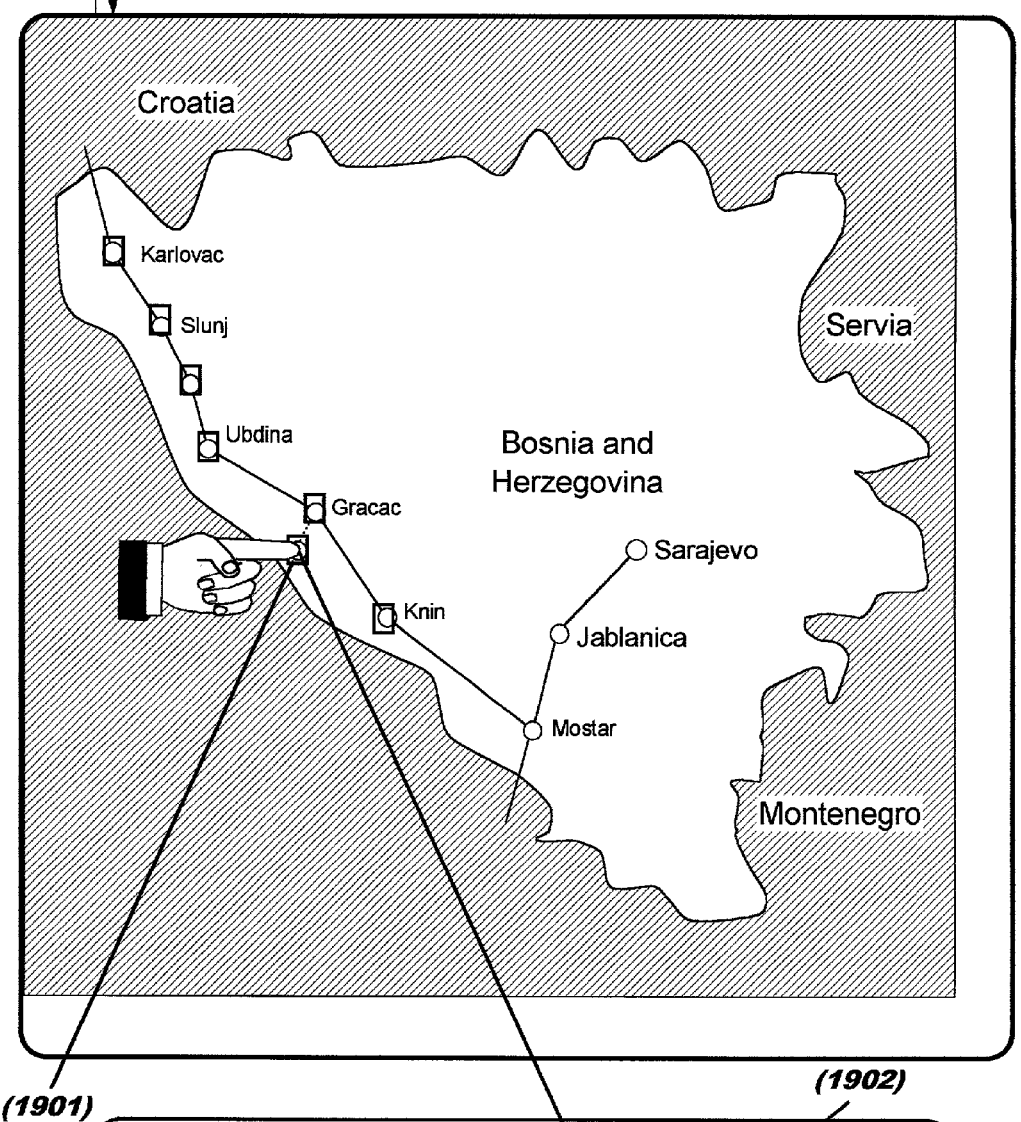
FIG. 19 shows how to identify a highlighted location on the map.
Figure 20:
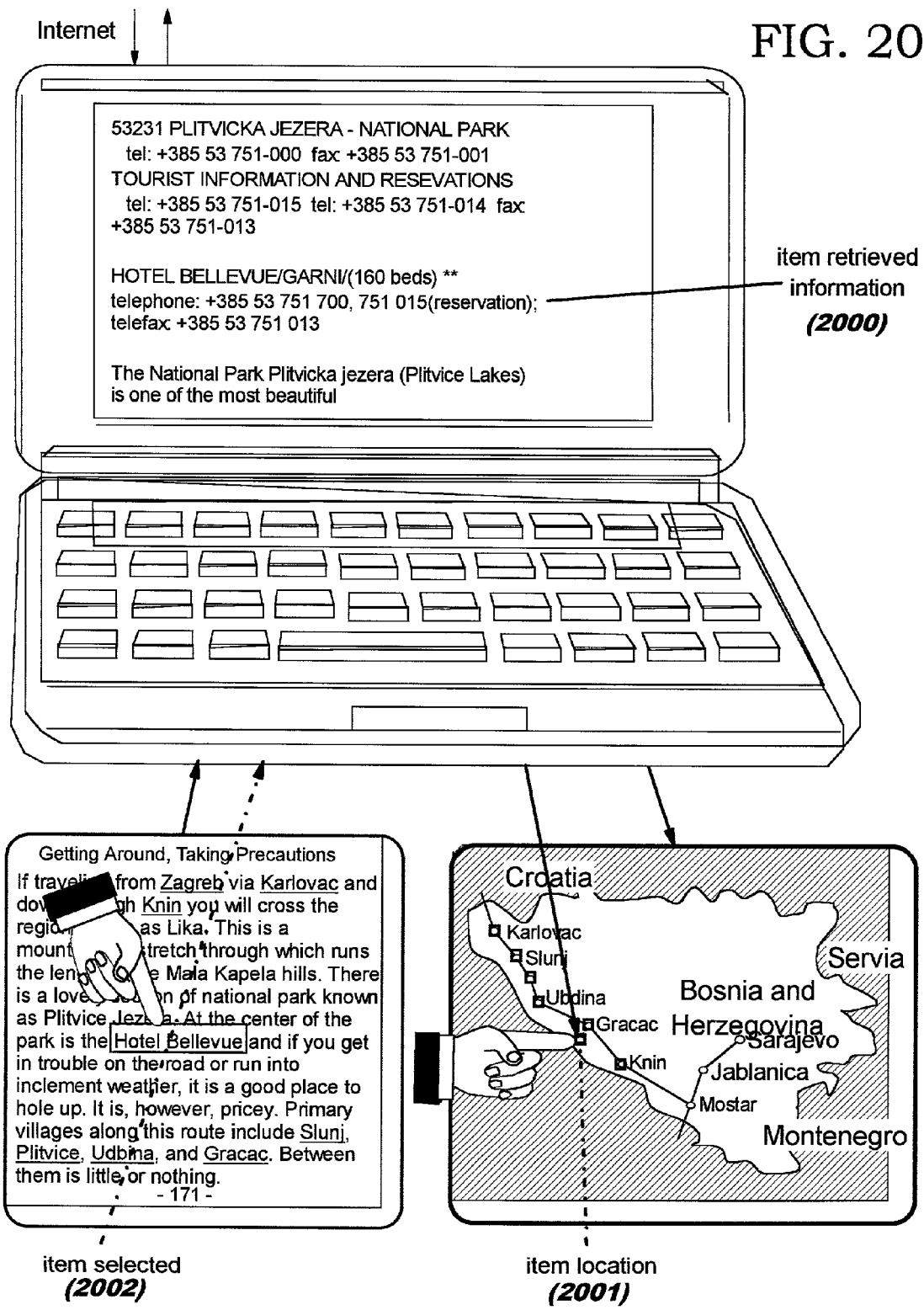
FIG. 20 shows how the user, by pressing on a location on a map or on a physical document, can retrieve from the Web information or service associated with said location.

After the calibration, the foil 2 coordinates corresponding to referenced items are computed and the hyperlink table is updated as follows:

Note: "geo-link" Plitvice has no associated hyperlink. This is an example of non-hyperlinked "geo-link" location.

ii) Highlighting on the map locations related to items referenced on the first physical document: As shown on FIG. 18, once the opto-touch foil has been calibrated, the locations inside the geographic area covered by the map (second physical document), related to items referenced in the first physical document (i.e., highlighted on it), are automatically highlighted on the map in the form of bright spots of light (1801) emitted by the opto-touch foil. These spots of lights enable the user to see at a glance the positions of all referenced items on the map. On FIG. 18, seven locations have been highlighted on the map, five of them are identified by a legend on the map (corresponding to the towns of Karlovac, Knin, Slunj, Udbina and Gracac). The other two light spots, not referenced on the map, correspond to any one of the remaining three places referenced on the Web page (i.e., Zagrev, Hotel Bellevue or Plitvice). These locations can be identified by the user.

iii) Identifying the location on the map of the items referenced in the first physical document: As shown in FIG. 19, to recognize a location highlighted on the map (second physical document) but not identified (i.e., named) on this map, the user presses the opto-touch foil with a fingertip on the point (illuminated spot) corresponding to this location (1901). Doing this causes the light spot emitted by the opto-touch foil (104) placed over/under the map (105) to blink on this location (1901), and the light spot emitted by the opto-touch foil (101) placed over/under the first physical document to blink on the corresponding referenced item (1902). FIG. 19 shows how the user can locate in this way the "Hotel Bellevue".

iv) Accessing the hyperlinked information: As shown on FIG. 20, to access the information or service associated with an item referenced in the first physical document, the user activates the corresponding hyperlink by pressing on the point on the map (2001) corresponding to the location of this

| Doc: 0387 | | Title: "Travel Guide to the Balkans" | Author: Bosiljko Vasilj Medjugoje, Bosnia & Herzegovina Phone: (387-88) 650-055 | |
|---|---|---|---|---|
| | | Date: 28/01/2000 | ISBN: 84-344-0856-2 | |
| Calib. Location: Knin | | URL: http://www.linder.com/berserk/dalmatia.html | Map Scale: 1,250,000 | Foil Resolut. 0,2 |
| Pg: 16 | | | | |
| LOCATION | FOIL 1 X/Y | HYPERLINK | LAT/LONG | FOIL 2 X/Y |
| Zagrev | 125 110 | http://www.interconti.com/croatia/zagreb/hotel_zagic.html | N 045° 36' 04" E 016° 12' 20" | -000 -000 |
| Karlovak | 170 110 | http://www.hr/hrvatska/HRgradovi/Karlovac/uvod-en.htm | N 045° 28' 17" E 015° 43' 35" | 060 045 |
| Knin | 190 110 | http://www.sibenik-knin.com/ | N 044° 03' 21" E 016° 15' 26" | 235 655 |
| Hotel Bellevue | 35 155 | http://www.tel.hr/np-plitvice/smje/bellevue.htm | N 044° 18' 46" E 015° 45' 06" | 085 585 |
| Slunj | 145 180 | http://mx1.xoom.com/slunj/ | N 045° 13' 53" E 015° 40' 18" | 050 155 |
| Plitvice | 170 180 | | N 044° 52' 38" E 015° 44' 37" | 070 290 |
| Udbina | 195 180 | http://www.aiha.com/english/partners/biozad/zdkn.htm | N 044° 31' 19" E 015° 45' 22" | 110 445 |
| Gracac | 215 180 | http://www.crotours.com/English/Beauties/Parks/velebit.htm | N 044° 21' 07" E 015° 48' 36" | 125 555 | item, or on the point on the first physical document (2002) corresponding to the item. The hyperlinked URL, if any, is then accessed through the Web, and the information on this URL address (2000) is retrieved and displayed on the user workstation. FIG. 15 shows the information concerning the "Hotel Bellevue" that is retrieved from the Web simply by activating the corresponding "geographic link" (2001) from the paper map.

Practically all types of published paper maps (e.g., provided by geographic or cartographic services or by third parties), at any scale, can advantageously be used by the present invention. Paper maps (511) can be published and used independently of published physical documents (509). Because the hyperlink tables (510) created for physical documents (509) comprise the cartographic coordinates (i.e., the "geographic links") of the locations to highlight on maps, hotels, restaurants, pharmacies, shops or businesses of any type (513) can be easily located and identified on these maps when browsing physical documents, thus attracting the interest of potential customers. Public authorities can help people to locate, by means of hard-copy documents and maps, all kinds of services, resources or places of cultural or economic interest.

Figure 21:
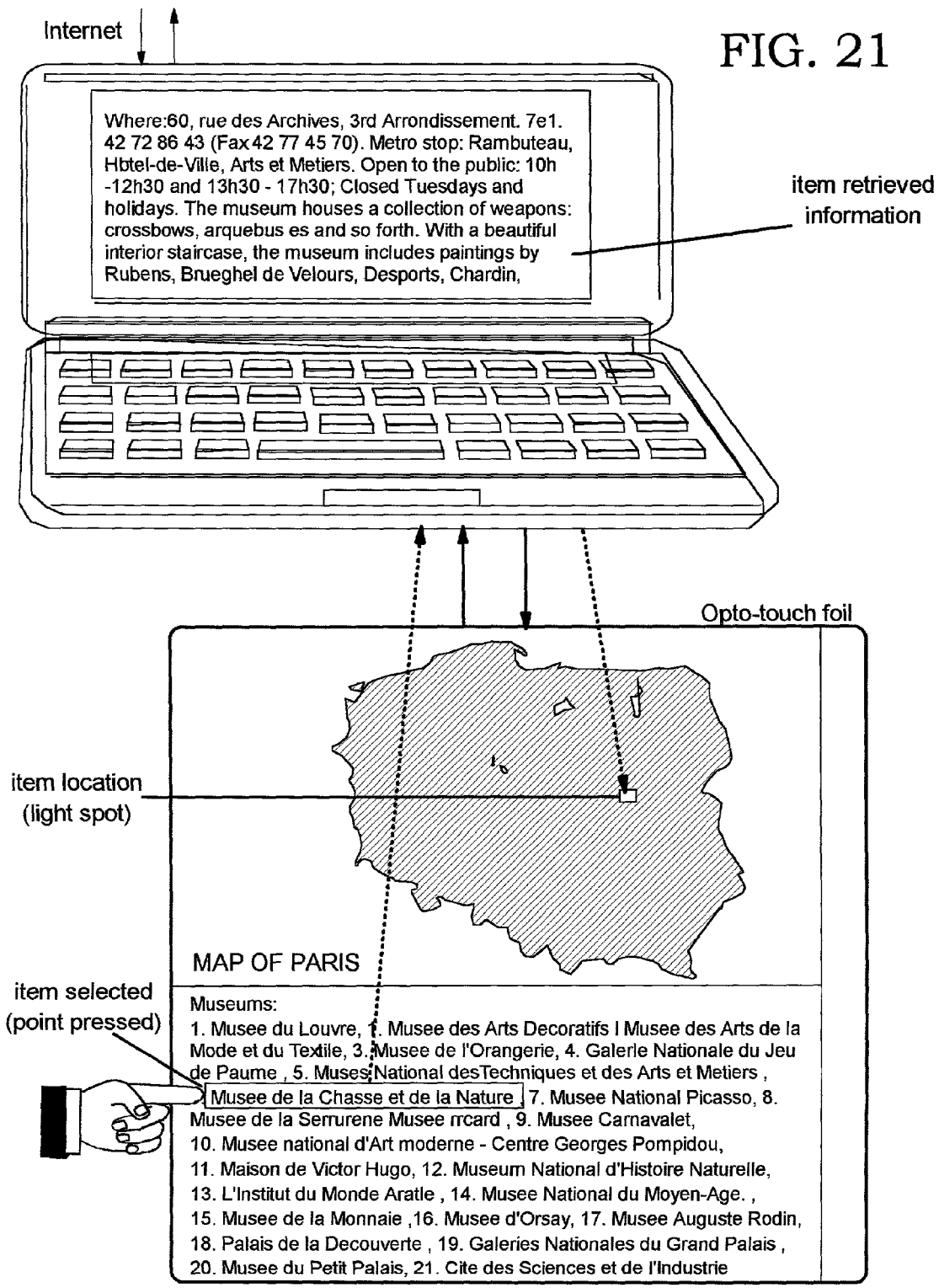
FIG. 21 shows a particular embodiment of the present invention and more particularly a method for locating in a physical document items referenced in this physical document.

Method of Highlighting on a Physical Document Locations Related with Items Selected in the Same Document Another embodiment of the present invention is illustrated in FIG. 21. This embodiment includes a method and system for selecting and accessing information or services by touching hyperlinked items (for example 6. Musee de la Chasse et de la Nature) on a physical document and for illuminating on the same physical document (Map of Paris) items or locations related to said hyperlinked items.

The present invention can be used in many applications. The differences between these applications are mainly due to the type of graphical information shown on the hard-copy documents and to the type of document used to trigger the hyperlinks and "geo-links". Being apparent that, apart from the herein described applications, there are many other possible applications of this invention, what has been described is merely illustrative of the application of the principles of the present invention. Once having been taught the invention, those skilled in the art will recognize that other arrangements and methods may be implemented without departing from the spirit and the scope of the present invention.

The invention claimed is:

1. A method, for use on a user system, of creating hyperlinks from hyperlinked items referenced in a first physical document to particular points on a second physical document, said method comprising the steps of:

creating a hyperlink table for the first physical document;

storing in said hyperlink table an identification of the first physical document;

storing in said hyperlink table an identification of a page of the first physical document and an identification of a hyperlinked item defined on said page;

associating with the hyperlinked item a point on a page of a second physical document;

storing in said hyperlink table absolute coordinates of the associated point;

determining a position of a point pressed on a first opto-touch foil, the first opto-touch foil being aligned with the first physical document, said point corresponding to a position of the hyperlinked item on the page of the first physical document; and storing in the hyperlink table, the position of the point pressed, said hyperlink table comprising for the hyperlinked item, an indication of the position of the hyperlinked item on the page of the first physical document in terms of foil coordinates with respect to the first opto-touch foil.

2. The method of claim 1, further including the steps of:

computing from the absolute coordinates, foil coordinates with respect to the second opto-touch foil corresponding to position on a second opto-touch foil aligned with the page of the second physical document; and storing the foil coordinates with respect to the second opto-touch foil in the hyperlink table.

3. The method of claim 2, further comprising calibrating the second opto-touch foil with respect to a referenced item in the first physical document.

4. The method of claim 1, further including the step of:

storing in said hyperlink table an identification and a location of information associated with each defined hyperlinked item of a plurality of hyperlinked items.

5. The method of claim 4, wherein the step of storing in said hyperlink table an identification and a location of information associated with each defined hyperlinked item further includes the step of:

storing a destination address in the communication network where the information associated with the hyperlinked item can be accessed.

6. The method of claim 1, wherein said user system is connected to a communication network comprising at least one server, and wherein the information associated with the hyperlinked items is located on said at least one server.

7. The method of claim 1, wherein the information associated with the hyperlinked items is located on the user system.

8. The method of claim 1, wherein said second physical document is a geographic map and said absolute coordinates are geographic coordinates.

9. A system, comprising:

a first opto-touch foil aligned with a page of a first physical document;

a user system;

a connection between said first opto-touch-foil and said user system;

a second opto-touch foil aligned with a second physical document;

a connection between said second opto-touch-foil and said user system;

a hyperlink table;

means for storing in said hyperlink table an identification of the first physical document;

means for storing in said hyperlink table an identification of a page of the first physical document and an identification of a hyperlinked item defined on said page;

means for associating with the hyperlinked item a point on a page of the second physical document;

means for storing in said hyperlink table absolute coordinates of the associated point;

means for determining a position of a point pressed on a first opto-touch foil, the first opto-touch foil being aligned with the first physical document, said point corresponding to a position of the hyperlinked item on the page of the first physical document; and means for storing in the hyperlink table, the position of the point pressed, said hyperlink table comprising for the hyperlinked item, an indication or the position of the hyperlinked item on the page of the first physical document in terms of foil coordinates with respect to the first opto-touch foil.

10. The system of claim 9, further including:

means for computing from the absolute coordinates, foil coordinates corresponding to position on a second opto-touch foil aligned with the page of the second physical document; and means for storing the foil coordinates of the second opto-touch foil in the hyperlink table.

11. The system of claim 9, further including:

means for storing in said hyperlink table an identification and a location of information associated with each defined hyperlinked item of a plurality of hyperlinked items.

12. The system of claim 11, wherein said means for storing in said hyperlink table an identification and a location of information associated with each defined hyperlinked item includes means for storing a destination address in the communication network where the information associated with the hyperlinked item can be accessed.

13. The system of claim 9, wherein said user system is connected to a communication network comprising at least one server, and wherein the information associated with the hyperlinked items is located on said at least one server.

14. The system of claim 9, wherein the information associated with the hyperlinked items is located on said user system.

15. The system of claim 11, wherein said second physical document is a geographic map and said absolute coordinates are geographic coordinates.

16. The system of claim 11, further comprising means for calibrating the second opto-touch foil with respect to a referenced item in the first physical document.

\* \* \* \* \*

UNITED STATES PATENT AND TRADEMARK OFFICE
CERTIFICATE OF CORRECTION

| | | |
|---|---|---|
| PATENT NO. | : 7,027,038 B2 | Page 1 of 1 |
| APPLICATION NO. | : 09/923150 | |
| DATED | : April 11, 2006 | |
| INVENTOR(S) | : Carro | |

It is certified that error appears in the above-identified patent and that said Letters Patent is hereby corrected as shown below:

Column 17
Line 18, delete "The Opto-touch Fail is Calibrated as Follows:" and insert
-- The opto-touch foil is calibrated as follows: --

Column 24
Line 11, delete "11" and insert -- 9 --
Line 14, delete "11" and insert -- 9 --

Signed and Sealed this

Eighth Day of August, 2006

JON W. DUDAS
*Director of the United States Patent and Trademark Office*